(12) United States Patent
Matysek

(10) Patent No.: US 6,398,537 B2
(45) Date of Patent: *Jun. 4, 2002

(54) SHUTTLE SYSTEM FOR AN APPARATUS FOR INJECTION MOLDING

(75) Inventor: Paul R. Matysek, Toronto (CA)

(73) Assignee: Mold-Masters Limited, Georgetown (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,148

(22) Filed: Apr. 8, 1999

Related U.S. Application Data
(60) Provisional application No. 60/135,100, filed on Apr. 2, 1999.

(51) Int. Cl.[7] .............................................. B29C 45/73
(52) U.S. Cl. ...................... 425/183; 425/533; 425/534; 425/556; 425/575; 425/577
(58) Field of Search ................................ 425/526, 534, 425/533, 547, 552, 556, 574, 575, 577, 183

(56) References Cited

U.S. PATENT DOCUMENTS

| | | | |
|---|---|---|---|
| 3,947,177 A | 3/1976 | Eckardt | 425/130 |
| 4,026,518 A | 5/1977 | Gellert | 251/330 |
| 4,035,466 A | 7/1977 | Langecker | 264/328 |
| 4,082,512 A | 4/1978 | Wiingard et al. | 23/252 |
| 4,174,413 A | 11/1979 | Yasuike | 428/35 |
| 4,376,625 A | 3/1983 | Eckardt | 425/564 |
| 4,433,969 A | 2/1984 | Gellert | 425/548 |
| 4,436,778 A | 3/1984 | Dugal | 428/36 |
| 4,472,131 A | 9/1984 | Ryder | 425/548 |
| 4,473,515 A * | 9/1984 | Ryder | 264/28 |
| 4,497,621 A | 2/1985 | Kudert et al. | 425/145 |
| 4,525,134 A | 6/1985 | McHenry et al. | 425/130 |

(List continued on next page.)

FOREIGN PATENT DOCUMENTS

| | | | | |
|---|---|---|---|---|
| CA | 1165525 A1 | 4/1984 | | B29F/1/03 |
| DE | 3201710 A | 8/1982 | | B29F/1/022 |
| DE | 195 27 756 A1 | 2/1996 | | B29C/49/06 |
| EP | 0 873 840 A1 | 10/1988 | | B29C/45/04 |
| EP | 0 372 671 A2 | 3/1989 | | B29C/49/06 |

(List continued on next page.)

OTHER PUBLICATIONS

"High Performance Polyester Packaging for Foods & Beverages," *Technologies*, 1996, pp. 42–70.
International Search Report dated Jul. 4, 2000.

*Primary Examiner*—Nam Nguyen
*Assistant Examiner*—Joseph S. Del Sole
(74) *Attorney, Agent, or Firm*—McDonnell Boehnen Hulbert & Berghoff

(57) ABSTRACT

An apparatus and method for injection molding including at least one nozzle capable of injecting a molten material, and a shuttling system with a first mold part and a second mold part. The first mold part has at least one injection cavity for receiving molten material that is aligned and in communication with the at least one nozzle. The first mold part also has at least a pair of cooling chambers flanking the at least one injection cavity. The second mold part has a laterally moveable shuttle plate with a first mold core and a second mold core. The first and second mold cores are capable of being aligned with and inserted into both the at least one injection cavity and the cooling chambers. Moreover, a first product can be formed on the first mold core in the at least one injection cavity, while a second product is simultaneously cooled in one of the cooling chambers, and the second product can be formed on the second mold core in the at least one injection cavity, while the first product is simultaneously cooled in another cooling chamber.

18 Claims, 19 Drawing Sheets

U.S. PATENT DOCUMENTS

| | | | |
|---|---|---|---|
| 4,526,821 A | 7/1985 | McHenry et al. | 428/35 |
| 4,541,982 A | 9/1985 | Upmeier | 264/349 |
| 4,542,054 A | 9/1985 | Fillmann | 428/68 |
| 4,550,043 A | 10/1985 | Beck | 428/36 |
| 4,568,261 A | 2/1986 | McHenry et al. | 425/145 |
| 4,592,710 A | 6/1986 | Bellehache et al. | 425/526 |
| 4,609,516 A | 9/1986 | Krishnakumar et al. | 264/255 |
| 4,615,925 A | 10/1986 | Nilsson | 428/35 |
| 4,646,925 A | 3/1987 | Nohara | 215/1 C |
| 4,657,496 A | 4/1987 | Ozeki et al. | 425/130 |
| 4,701,292 A | 10/1987 | Valyi | 264/255 |
| 4,710,118 A | 12/1987 | Krishnakumar et al. | 425/130 |
| 4,715,802 A | 12/1987 | Arai | 425/130 |
| 4,717,324 A | 1/1988 | Schad et al. | 425/130 |
| 4,728,549 A | 3/1988 | Shmizu | 428/35 |
| 4,740,151 A | 4/1988 | Schmidt et al. | 425/549 |
| 4,743,479 A | 5/1988 | Nakamura et al. | 428/35 |
| 4,744,742 A | 5/1988 | Aoki | 425/126.1 |
| 4,774,047 A | 9/1988 | Nakamura et al. | 264/513 |
| 4,775,308 A | 10/1988 | Schad et al. | 425/130 |
| 4,781,954 A | 11/1988 | Krishnakumar et al. | 428/35 |
| 4,808,101 A | 2/1989 | Schad et al. | 425/130 |
| 4,847,129 A | 7/1989 | Collette et al. | 428/35.7 |
| 4,863,369 A | 9/1989 | Schad et al. | 425/547 |
| 4,863,665 A | 9/1989 | Schad et al. | 264/255 |
| 4,892,699 A | 1/1990 | Kudert et al. | 264/328.8 |
| 4,895,504 A | 1/1990 | Kudert et al. | 425/133.1 |
| 4,910,054 A | 3/1990 | Collette et al. | 428/35.7 |
| 4,923,723 A | 5/1990 | Collette et al. | 428/35.7 |
| 4,931,234 A | 6/1990 | Schad et al. | 264/40.1 |
| 4,934,915 A | 6/1990 | Kudert et al. | 425/132 |
| 4,936,858 A | 6/1990 | Gellert et al. | 425/564 |
| 4,944,909 A | 7/1990 | Eckardt et al. | 264/255 |
| 4,950,143 A | 8/1990 | Krishnakumar | 425/130 |
| 4,954,376 A | 9/1990 | Krishnakumar et al. | 428/35.7 |
| 4,957,682 A | 9/1990 | Kobayashi et al. | 264/255 |
| 4,965,028 A | 10/1990 | Maus et al. | 264/297.2 |
| 4,978,493 A | 12/1990 | Kersemakers et al. | 264/255 |
| 4,990,301 A | 2/1991 | Krishnakumar | 264/513 |
| 4,994,313 A | 2/1991 | Shimizu | 428/36.7 |
| 5,022,846 A | 6/1991 | Schmidt | 425/564 |
| 5,028,226 A | 7/1991 | Death et al. | 425/130 |
| 5,030,077 A | 7/1991 | Orimoto et al. | 425/130 |
| 5,032,341 A | 7/1991 | Krishnakumar et al. | 264/255 |
| 5,040,963 A | 8/1991 | Beck et al. | 425/130 |
| 5,049,345 A | 9/1991 | Collette et al. | 264/255 |
| 5,051,227 A | 9/1991 | Brun, Jr. et al. | 264/537 |
| 5,077,111 A | 12/1991 | Collette | 428/36.7 |
| 5,093,053 A | 3/1992 | Eckardt et al. | 264/45.1 |
| 5,094,603 A | 3/1992 | Gellert | 425/130 |
| 5,098,274 A | 3/1992 | Krishnakumar | 425/133.1 |
| 5,106,284 A | 4/1992 | Kobayashi et al. | 425/130 |
| 5,125,817 A | 6/1992 | Yamachika | 425/130 |
| 5,131,830 A | 7/1992 | Orimoto et al. | 425/130 |
| 5,135,377 A | 8/1992 | Gellert | 425/130 |
| 5,141,695 A | 8/1992 | Nakamura | 264/255 |
| 5,143,733 A | 9/1992 | Von Buren et al. | 425/130 |
| 5,151,025 A | 9/1992 | Müller | 425/199 |
| 5,162,121 A | 11/1992 | Kawaguchi et al. | 425/130 |
| 5,200,207 A | 4/1993 | Akselrud et al. | 425/557 |
| 5,202,074 A | 4/1993 | Schrenk et al. | 264/241 |
| 5,215,762 A | 6/1993 | Eder et al. | 425/130 |
| 5,221,507 A | 6/1993 | Beck et al. | 264/255 |
| 5,223,275 A | 6/1993 | Gellert | 425/130 |
| 5,252,268 A | 10/1993 | Ohno | 264/40.7 |
| 5,260,012 A | 11/1993 | Arnott | 264/69 |
| 5,262,119 A | 11/1993 | Smith | 264/513 |
| RE34,552 E | 2/1994 | Krishnakumar et al. | 438/35.7 |
| 5,288,451 A | 2/1994 | Schad | 264/328.8 |
| 5,301,838 A | 4/1994 | Schmidt et al. | 222/95 |
| 5,380,479 A | 1/1995 | Schrenk et al. | 264/241 |
| 5,387,099 A | 2/1995 | Gellert | 425/564 |
| 5,407,629 A | 4/1995 | Schmidt et al. | 264/512 |
| 5,498,150 A | 3/1996 | Check | 425/526 |
| 5,501,593 A * | 3/1996 | Marcus | 425/547 |
| 5,523,045 A | 6/1996 | Kudert et al. | 264/513 |
| 5,573,791 A | 11/1996 | Marcus | 425/523 |
| 5,582,788 A | 12/1996 | Collette et al. | 264/297 |
| 5,582,851 A | 12/1996 | Hofstetter et al. | 425/562 |
| 5,589,130 A | 12/1996 | Takada et al. | 264/537 |
| 5,614,233 A | 3/1997 | Gellert | 425/549 |
| 5,628,950 A | 5/1997 | Schrenk et al. | 264/241 |
| 5,628,957 A | 5/1997 | Collette et al. | 264/512 |
| 5,645,786 A | 7/1997 | Okada et al. | 264/255 |
| 5,650,178 A | 7/1997 | Bemis et al. | 425/130 |
| 5,651,998 A | 7/1997 | Bertschi et al. | 425/127 |
| 5,662,856 A * | 9/1997 | Wunderlich | 264/297.2 |
| 5,705,202 A | 1/1998 | Gellert | 425/549 |
| 5,795,600 A | 8/1998 | Rozema | 425/562 |
| 5,830,524 A | 11/1998 | Braun | 425/549 |
| 5,843,361 A | 12/1998 | Gellert | 264/297.2 |

FOREIGN PATENT DOCUMENTS

| | | | | |
|---|---|---|---|---|
| EP | 0 372 671 A2 * | 6/1990 | | |
| EP | 0 633 119 A1 | 6/1994 | | B29C/45/42 |
| EP | 0 688 651 A1 | 6/1995 | | B29C/45/04 |
| EP | 0 688 651 A1 * | 12/1995 | | |
| EP | 0 688 651 A1 | 12/1996 | | B29C/45/04 |
| EP | 0 768 163 A1 | 4/1997 | | B29C/45/16 |
| EP | 0 799 683 A2 | 10/1997 | | B29C/45/16 |
| EP | 0 839 629 A1 | 8/1998 | | B29C/45/16 |
| EP | 0 873 840 A1 * | 10/1998 | | |
| EP | 894 604 A1 | 2/1999 | | B29C/45/16 |
| WO | WO 98/13187 | 4/1998 | | B29C/45/16 |
| WO | WO 00/29193 | 5/2000 | | B29C/45/72 |

* cited by examiner

STAGE 2

STAGE 4

STAGE 5

STAGE 7

STAGE 9

STAGE 11

STAGE 12

SHUTTLE SYSTEM FOR AN APPARATUS FOR INJECTION MOLDING

This application claims the benefit of U.S. Provisional Application Ser. No. 60/135,100, filed Apr. 2, 1999.

FIELD OF INVENTION

The present invention relates to a multi-cavity injection molding apparatus and method for making single or multi-layer molded products. More specifically, it relates to an apparatus and method for injection molding with a high-speed shuttling system.

BACKGROUND OF THE INVENTION

Multi-cavity injection molding apparatus for making single or multi-layer molded products, such as protective containers for food, preforms for beverage bottles, and closures, are well-known. One or more types of molten material are typically injected into a cavity from a nozzle aligned with the cavity to form the molded product. Once the molten material in the cavity has cooled enough to solidify, the injection molding apparatus is usually opened to eject the molded product from the cavity. In order to properly cool and solidify, however, the molten material must remain in the cavity aligned with the nozzle for several seconds before the injection molding apparatus can be opened. As a result, the injection molding apparatus has to wait this same amount of time before the cavity can be refilled with new molten material to form a new molded product. This arrangement causes the injection molding apparatus of the prior art to have relatively high cycle or production times. While decreasing the amount of cooling time for the molded products can help reduce this relatively high cycle or production time, such a decrease in the cooling time can result in a lower quality molded product.

Some attempts have been made to overcome the disadvantages associated with the injection molding apparatus of the prior art. For example, in U.S. Pat. No. 4,472,131 to Ryder, an injection molding apparatus for preforms is disclosed that comprises alternate rows of injection and cooling cavities on a stationary plate. Ryder teaches injecting molten material into the injection cavities, and then moving the preform into a cooling cavity for post-mold cooling. In order to eject the preform from the apparatus, however, Ryder discloses the use of a complex, combined mechanical and pneumatic ejection device. While allowing a shorter overall cycle time, the pressurized air used by the complex ejection device required by Ryder may cause damage to the preforms, especially if the preforms have not fully cooled.

Another attempt to reduce the cycle time required by prior art injection molding apparatus is disclosed in U.S. Pat. No. 5,051,227 to Brun. Similar to Ryder, Brun also discloses an injection molding apparatus for preforms that comprises alternate rows of injection and cooling cavities on a stationary plate. After the injection step, Brun teaches that the mold cores are removed from the preforms while retaining the preforms using neck rings. According to Brun, a stripper plate carrying the neck rings is then moved laterally between two positions in alignment with the injection and cooling cavities. Brun then teaches inserting the molded preforms into the cooling cavities, while blowing pins are introduced inside the preform for enlarging the preforms to make contact with the walls of the cooling cavities. The injection molding apparatus disclosed by Brun, however, requires that the preforms be removed from the mold cores during the lateral movement of the preforms between the injection and cooling cavities. Besides requiring additional cooling steps (i.e., the use of blowing pins), Brun does not provide internal cooling or support for the molded preforms with the mold cores. As a result, without the mold cores, the preforms are subject to damage during their lateral movement, since they may not be totally cooled or supported.

Yet another example of an attempt to overcome the high cycle times of the prior art injection molding apparatus is disclosed in U.S. Pat. No. 5,589,130 to Takada. Takada teaches a vertical injection molding apparatus that has a rotary mold core plate with at least two positions. In the first position disclosed by Takada, preforms are injection molded and cooled while the injection molding apparatus is in the closed position. In the second position disclosed by Takada, the injection molding apparatus is opened, and the molded preforms retained on the mold cores are transferred to a cooling and ejection station through a rotary movement of the mold core plate. While a new batch of preforms are injected in the first position, Takada teaches ejecting the cooled molded preforms in the second position. The post-mold cooling of the preforms in the second position disclosed by Takada, however, is done only internally by the mold cores. Thus, the preforms are not cooled from the outside in the second position disclosed by Takada, resulting in a longer amount of time needed to properly cool the preforms. In addition, the finally cooled preforms in Takada are ejected in the second position through a two-step process: first, the preforms are pushed off of the cooling cores; and second, the two neck rings holding and cooling the preform are separated to completely release the preform. By requiring two separate movements for ejecting the preforms, Takada adds more time to the total cycle or production time of the injection molding apparatus. In addition, the ejection mechanism of Takada acts upon all the preforms at once, resulting in a diminished amount of cooling time for one or more of the preforms.

Other attempts to overcome the high cycle times and disadvantages associated with the prior art injection molding apparatus have similarly fallen short, and/or have created other disadvantages that reduce the overall efficiency and simplicity of the injection molding apparatus. Examples include U.S. Pat. No. 5,501,593, EP Patent Application No. 0 688 651 A1, and EP Patent Application No. 0 873 840 A1.

Accordingly, it would be desirable to have an apparatus and method for injection molding that overcomes the problems associated with the prior art by implementing an efficient shuttling system that reduces the overall cycle or production time for the products to be molded. In particular, it would be desirable to have a shuttling system that minimizes cycle time, while maximizing cooling time for the molded products. In addition, it would be desirable to have a shuttling system that does not use complex ejection mechanisms, such as those using pneumatic means or a multi-step process, and yet provides proper internal and external cooling and support of the molded products during operation of the injection molding apparatus. It would also be desirable to use a shuttling system that can be readily implemented into standard injection molding apparatus, as opposed to specially designed injection molding apparatus.

Moreover, there is a need for an improved, simple, and fast ejection mechanism that acts solely on the post-molding cooled products. There is also a need for an improved, simple, and fast robot device to handle and remove the post-molding cooled products. Consequently, there is also a need for an improved control system to coordinate the movements of the shuttling system, ejection mechanism, and robot device to reduce the overall cycle time and increase the efficiency of the injection molding apparatus.

SUMMARY OF THE INVENTION

The present invention provides an injection molding apparatus for molding products comprising at least one nozzle capable of injecting a molten material and a first mold part having at least one injection cavity for receiving molten material. The at least one injection cavity is aligned and in communication with the at least one nozzle. The first mold part also has at least a pair of cooling chambers flanking the at least one injection cavity. In addition, the injection molding apparatus comprises a second mold part having a laterally moveable shuttle plate with a first mold core and a second mold core. The first and second mold cores are capable of being aligned with and inserted into both the at least one injection cavity and the cooling chambers. Moreover, a first product can be formed on the first mold core in the at least one injection cavity, while a second product is simultaneously cooled in one of the cooling chambers, and the second product can be formed on the second mold core in the at least one injection cavity, while the first product is simultaneously cooled in another cooling chamber.

In addition, the present invention provides a shuttling system for an injection molding apparatus comprising a first mold part having a cavity plate with at least one injection cavity positioned between at least a pair of cooling chambers, and a second mold part having a laterally moveable shuttle plate with a first mold core and a second mold core. The first and second mold cores are capable of being aligned with and inserted into both the at least one injection cavity and the cooling chambers., The shuttling system of the present invention further comprises a first ejection mechanism for the first mold core and a second ejection mechanism for the second mold core, with the first ejection mechanism capable of being actuated independently of the second ejection mechanism.

The present invention also provides a method for injection molding of products comprising the steps of moving a first mold core into an injection cavity to form a first cavity, and injecting molten material into the first cavity to form a first product on the first mold core. In addition, the method of the present invention comprises the steps of cooling a second product on a second mold core in a first cooling chamber, while the molten material is injected into the first cavity, and moving the first product on the first mold core into a second cooling chamber. The method of the present invention further comprises the steps of ejecting the second product from the second mold core, moving the second mold core into the injection cavity to form a second cavity, and injecting molten material into the second cavity to form a third product on the second mold core. Additionally, the method of the present invention comprises the step of cooling the first product on the first mold core in the second cooling chamber, while the molten material is injected into the second cavity.

DETAILED DESCRIPTION OF PREFERRED EMBODIMENTS

Figure 1:
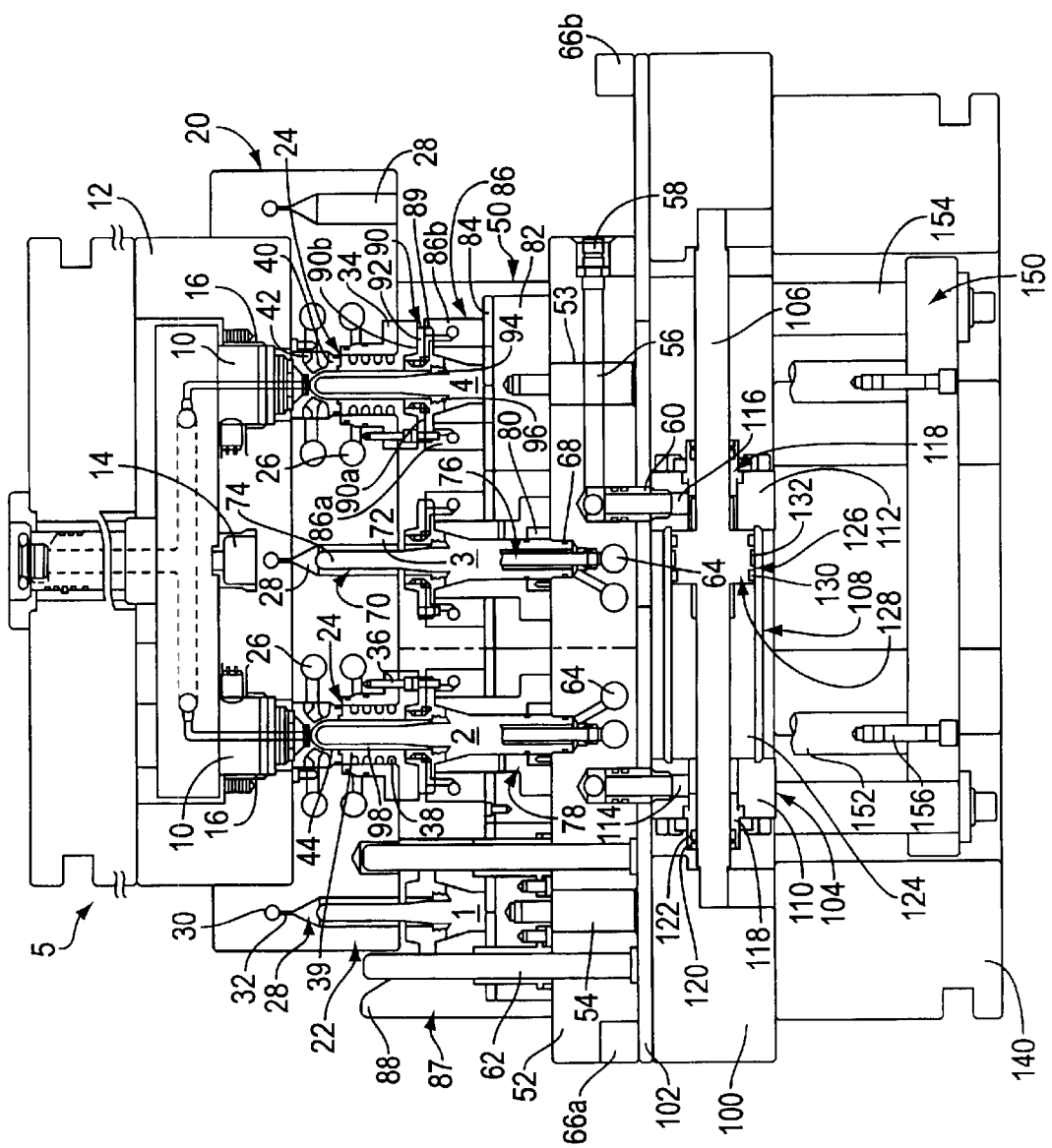
FIG. 1 is a cross-sectional view of a multi-cavity injection molding apparatus of the present invention for a bottle preform.
Figure 2:
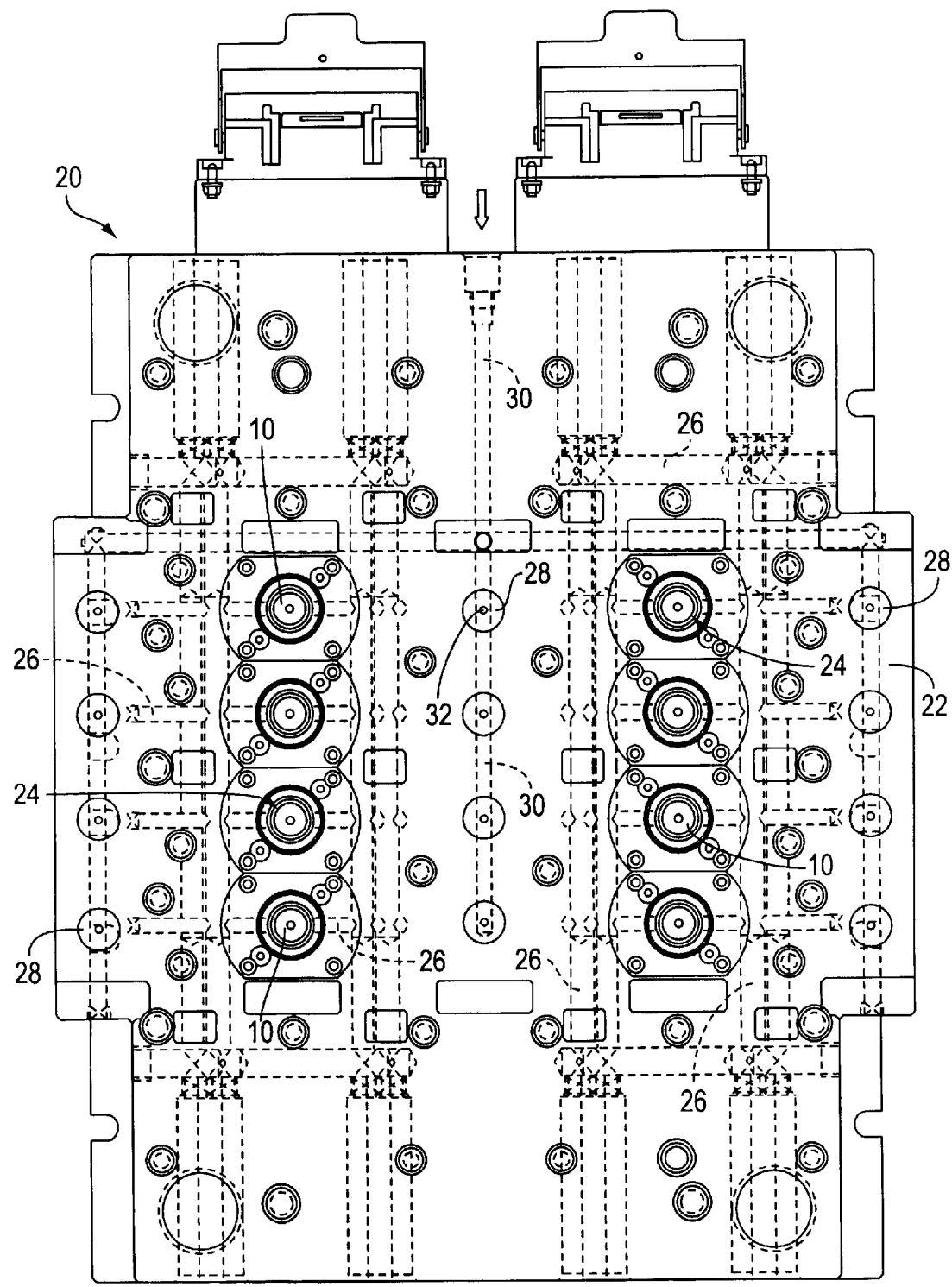
FIG. 2 is a top or side view of a first mold part of the injection molding apparatus of FIG. 1.
Figure 3:
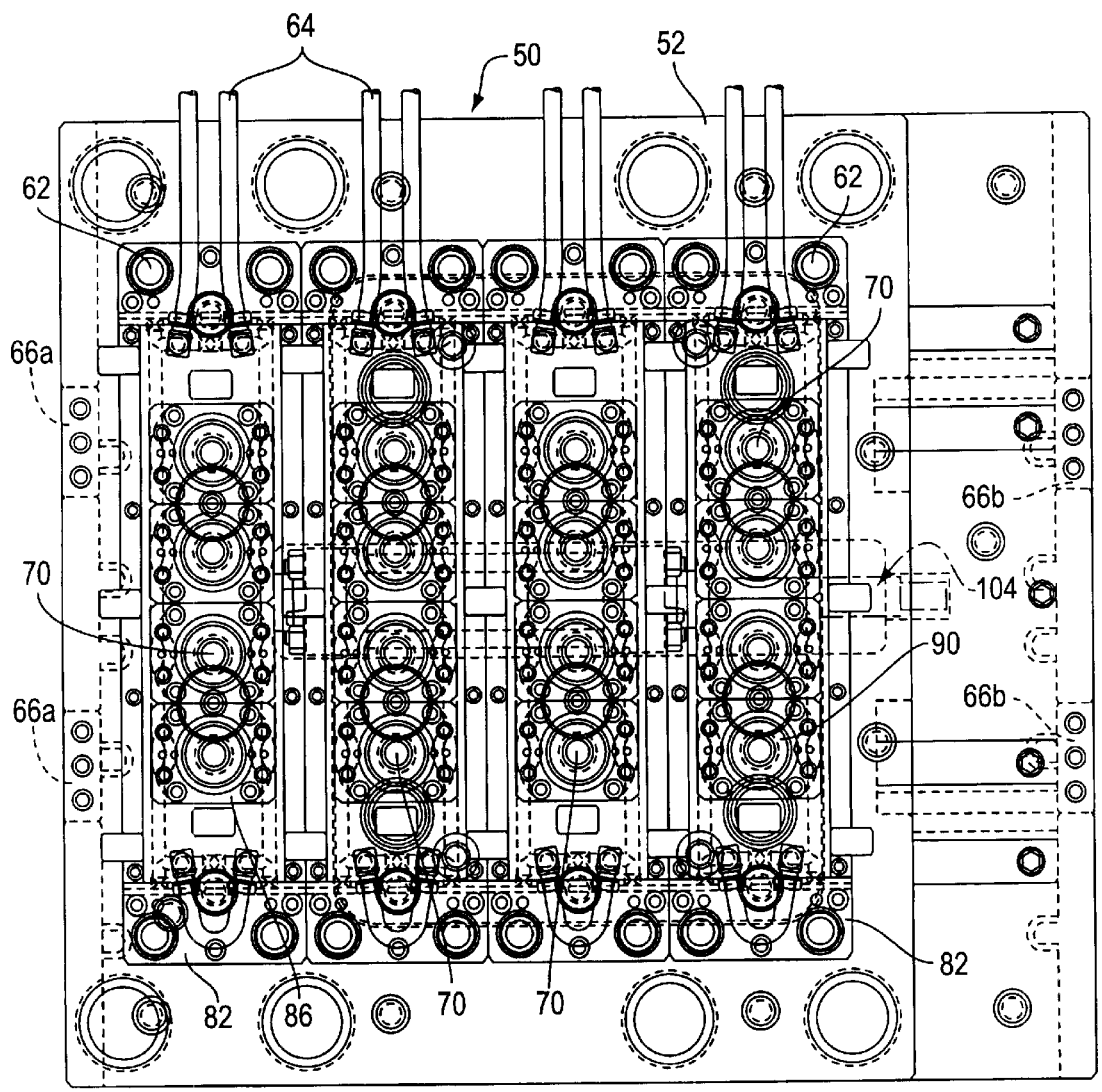
FIG. 3 is a top or side view of a second mold part of the injection molding apparatus of FIG. 1.

Turning now to the drawings, FIGS. 1–3 showed a preferred embodiment of a portion of a multi-cavity injection molding apparatus 5 of the present invention with a plurality of nozzles 10 for molding preforms, closures or other products by sequential and/or simultaneous coinjection. Although only eight nozzles are shown in FIG. 2 for ease of illustration, any desirable number of nozzles (i.e., 12, 16, or 48) may be used with the apparatus of the present invention. Preferably, each additional nozzle would have identical features to the nozzles 10 shown in FIGS. 1 and 2.

Besides the nozzles 10, the apparatus 5 also comprises a nozzle retainer plate 12, a first mold part 20, a second mold part 50, a support plate 100, riser bars 140, and an ejector plate 150. Preferably, the nozzle retainer plate 12 is joined together with the first mold part 20. It should also be understood that the apparatus 5 can have a greater or fewer number of plates and/or parts depending upon the application, and for the sake of clarity and ease of illustration, only the above-identified plates and parts are shown in detail in the drawings and described below.

The nozzle retainer plate 12 is located about a manifold locator 14, as best shown in FIG. 1. The nozzle retainer plate 12 has a plurality of nozzle seat openings 16 for receiving the nozzles 10. Preferably, there is a separate nozzle seat opening 16 for every nozzle 10 of the injection molding apparatus 5. In addition, each nozzle 10 is in communication with one or more sources (not shown) of molten material, such as polyethylene terephthalate ("PET"), polypropylene, ethylene vinyl alcohol ("EVOH"), or nylon. For more information on nozzles suitable for use with the present invention, see U.S. patent application Ser. No. 09/271,835, entitled "Apparatus and Method for Multi-Layer Injection Molding," filed on Mar. 18, 1999, and U.S. patent application Ser. No. 09/274,443, entitled, "Apparatus and Method for Multi-Layer Injection Molding," filed on Mar. 22, 1999, both commonly assigned with the present invention and specifically incorporated in their entirety herein.

The first mold part 20 includes a cavity plate 22 fixedly mounted to the nozzle retainer plate 12. The cavity plate 22 has an injection cavity 24 aligned with each nozzle 10. As best shown in FIG. 2, there are preferably two rows of four injection cavities 24 (i.e., eight total) to match the eight nozzles 10. The cavity plate 22 also has a plurality of cooling channels 26 surrounding and in communication with the injection cavities 24. Several types of different cooling fluids may be sent through the cooling channels 26, including, but not limited to, cooled water.

The cavity plate 22 further includes a plurality of cooling chambers 28 spaced about the injection cavities 24. As shown in FIG. 2, there is preferably an additional row of cooling chambers with respect to the injection cavities, such as for example three rows of four cooling chambers 28 (i.e., 12 total) interleaved with the two rows of injection cavities 24, with a pair of cooling chambers 28 flanking each injection cavity 24. The cavity plate 22 also comprises a plurality of cooling lines 30, which are in communication with the cooling chambers 28 through a plurality of cooling access lines 32, as shown in FIGS. 1 and 2. Several types of different cooling fluids may be sent through the cooling lines 30 and the cooling access lines 32, including, but not limited to, cooled air.

The first mold part 20 also comprises a plurality of cavity inserts 34 and gate inserts 40. A cavity insert 34 is preferably positioned in each injection cavity 24, spaced from the respective nozzle 10 aligned with the injection cavity 24. The cavity inserts 34 may also be connected to the cavity plate 22 with bolts 36. Each cavity insert 34 also preferably has a plurality of annular cooling rings 38 in communication with the adjacent cooling channels 26, as shown in FIG. 1. In addition, each cavity insert 34 has a central bore 39.

The gate inserts 40 are positioned in the injection cavities 24 between the cavity inserts 34 and the nozzles 10. Like the cavity inserts 34, each gate insert 40 has a plurality of annular cooling rings 42 in communication with the adjacent cooling channels 26, as shown in FIG. 1. Also, each gate insert 40 has a central bore 44 aligned and in communication with the adjacent nozzle 10 and the central bore 39 of the adjacent cavity insert 34.

As shown in FIG. 1, the second mold part 50 comprises a movable shuttle plate 52 having a plurality of ejector bores 53 for receiving a plurality of ejector plugs 54. The shuttle plate 52 also has a plurality of hydraulic channels 56 with hydraulic fittings 58, as shown in FIGS. 1 and 3. Although not shown, the hydraulic fittings 58 are preferably connected to a hydraulic source of controlled fluid pressure (i.e., from oil or water). It should be understood that while only a hydraulic actuating mechanism is described and shown herein, other types of actuating mechanisms, such as electromechanical mechanisms, can be used with the apparatus of the present invention. Each hydraulic channel 56 is also connected to and in communication with a hydraulic coupling 60 opposite the hydraulic fittings 58. Each hydraulic coupling 60 is fixedly connected to the shuttle plate 52.

The shuttle plate 52 also has a plurality of support rods 62 extending from the shuttle plate 52 outward toward the cavity plate 22. In addition, the shuttle plate 52 also has a plurality of cooling passages 64. Also, since the shuttle plate is capable of being laterally moved between two different positions, as described in more detail below, a plurality of stoppers 66a, 66b are positioned around the shuttle plate 52 to prevent the shuttle plate 52 from moving beyond the desired positions. Preferably, there is at least one stopper 66a at a position A, and at least one other stopper 66b at a position B. For purposes of the preferred embodiment described herein, when the shuttle plate 52 rests against the stopper 66a, the shuttle plate 52 is in or at position A, and when the shuttle plate 52 rests against the stopper 66b, the shuttle plate 52 is in or at position B.

The shuttle plate 52 also comprises a plurality of mold core seat openings 68 for receiving a plurality of mold cores 70, with a mold core 70 being seated within each mold core seat opening 68. Preferably, there are four rows of four mold cores 70 (i.e., 16 total) aligned with the injection cavities 24 and two rows of the cooling chambers 28, as shown in FIG. 3. In addition, the lateral displacement of the mold cores 70 preferably has a pitch equal to the spacing between the injection cavities 24 and the cooling chambers 28. The close arrangement of the mold cores 70, as shown in FIGS. 1 and 3, allows the second mold part 50, as well as the rest of the injection molding apparatus 5, to have a very compact design.

As shown in FIG. 1, when the shuttle plate is placed against the stopper 66a in position A, the mold cores 70 are aligned with the injection cavities 24 and the two rows of cooling chambers 28 closest to the stopper 66a at position A. Likewise, when the shuttle plate 52 is placed against the other stopper 66b at position B, the mold cores 70 are aligned with the injection cavities 24 and the two rows of cooling chambers 28 closest to the stopper 66b at position B. In other words, at position A, the row of cooling chambers 28 closest to the stopper 66b at position B are not aligned with the mold core 70, while at position B, the row of cooling chambers 28 closest to the stopper 66a at position A are not aligned with the mold cores 70. In any event, there preferably are mold cores 70 aligned with the injection cavities 24 regardless of whether the shuttle plate is in position A or position B.

Each mold core 70 has a base 72 seated within its respective mold core seat opening 68, and an elongated stem portion 74 extending outward from the base toward the cavity plate 22. Each mold core 70 also preferably has a cooling passageway 76 extending substantially throughout the base 72 and the elongated stem portion 74 for internal cooling of molded preforms. Preferably, the cooling passageway 76 is in communication with one or more of the cooling passages 64 of the shuttle plate 52, as best shown in FIG. 1. In addition, it should be understood that, like the cooling channels 26, the cooling lines 30, and the cooling access lines 32, several types of different cooling fluids may be sent through the cooling passages 64 and the cooling passageways 76, including, but not limited to, cooled water or air.

When the injection molding apparatus 5 of the present invention is in a closed position, as shown in FIG. 1, a plurality of the elongated stem portions 74 of the mold cores 70 are positioned within the central bores 39, 44 of their respective cavity inserts 34 and gate inserts 40 located in the injector chambers 24. In this closed position, the elongated stem portions 74 of the mold core 70 and their respective cavity inserts 34 and gate inserts 40 together form and define a portion of a preform cavity 98 between them. The elongated stem portion 74 of the mold core 70 are also designed and adapted to be inserted within the cooling chambers 28, such that a space remains between the elongated stem portions 74 of the mold cores 70 and the cooling chambers 28 for proper external cooling of the mold cores 70, when the injection molding apparatus 5 is in the closed position.

The second mold part 50 also has a plurality of core locks 78 positioned against the shuttle plate 52 and surrounding the base 72 of each mold core 70. The second mold part 50 may also have a plurality of core lock nuts 80 positioned between the core locks 78 and their respective mold cores 70, as shown in FIG. 1. Together, the core locks 78 and the core lock nuts 80 fixedly mount the mold cores 70 to the shuttle plate 52.

As shown in FIG. 1, the second mold part 50 also comprises a plurality of stripper plates 82 disposed around each core lock 78. Each stripper plate 82 also has a wear plate 84 attached opposite the shuttle plate 52. Each wear plate 84 protects its respective stripper plate 82 from excessive wear or damage during operation of the present invention. Preferably, but not necessarily, the wear plates 84 are made out of a resilient, wear-resistant steel, such as bearing bronze.

The stripper plate 82 is also slideably mounted on the support rods 62 of the shuttle plate 52 for movement away from the shuttle plate 52 and toward the cavity plate 22, and also toward the shuttle plate 52 and away from the cavity plate 22. In addition, each stripper plate 82 is connected to one or more of the ejector plugs 54, as shown in FIG. 1.

The second mold part 50 further comprises a plurality of slides 86 disposed around each of the core locks 78 and slideably positioned against each wear plate 84. Each slide 86 travels forward toward and backward away from the cavity plate 22 along a pair of opposing actuating cams 87 with tapered ends 88. As each slide 86 moves along the tapered ends 88 of its respective actuating cams 87, the slide 86 separates into a first section 86a and a second section 86b. Preferably, the further each slide 86 moves along the tapered ends 88 of its respective actuating cams 87, the further its first section 86a separates from its second section 86b.

Figure 11:
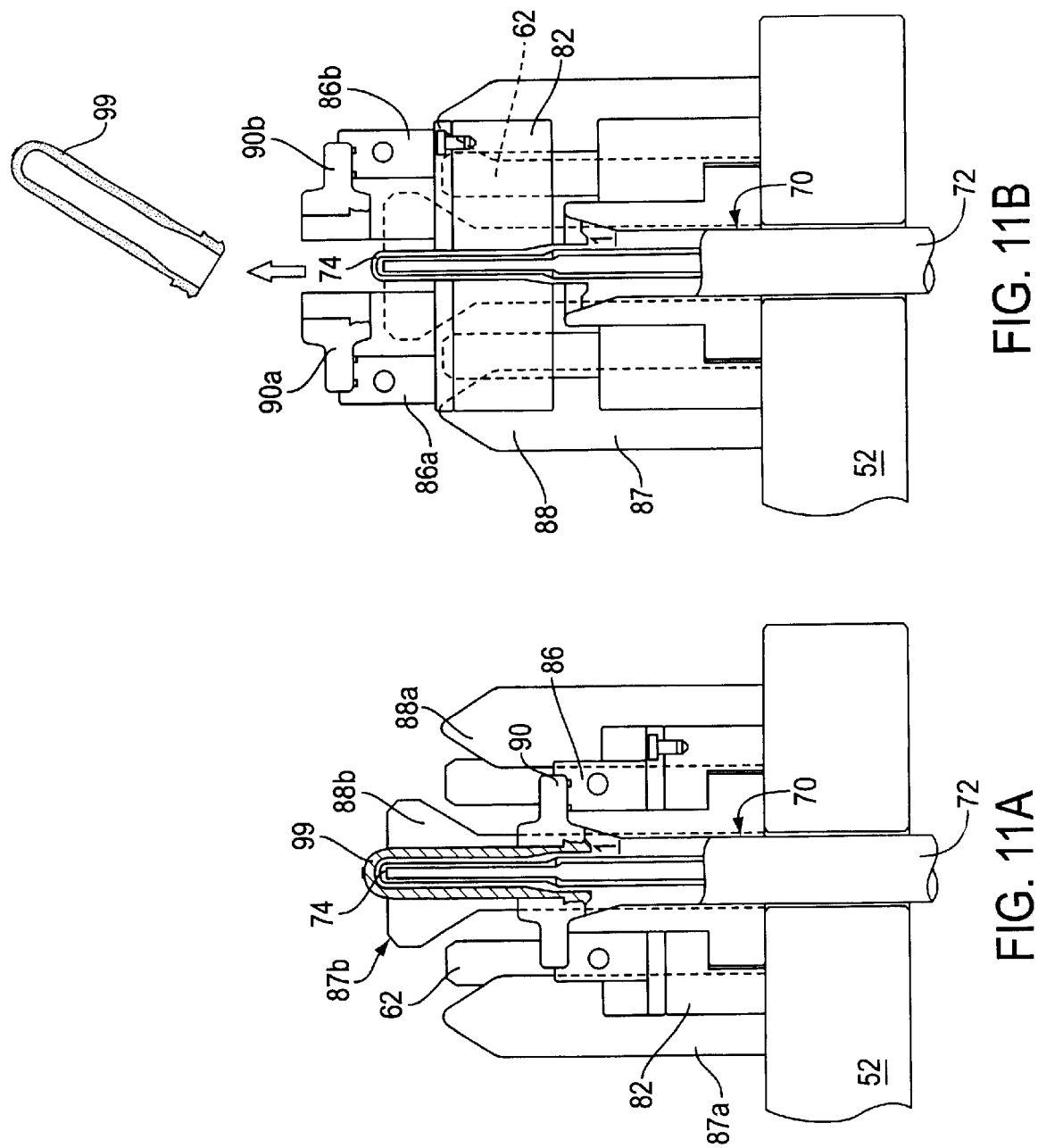
FIGS. 11A and 11B are enlarged partial top or side cross-sectional views of mold core 1 of the injection molding apparatus of FIG. 1, illustrating the sixth and seventh stages of FIGS. 9–10, respectively, for mold core 1.

Each actuating cams 87 is preferably comprised of a first portion 87a with first tapered ends 88a, and a second portion 87b with second tapered ends 88b, as best shown in FIG. 11A. Preferably, the second portion 87b is interleaved with the first portion 87a, and the first and second tapered ends 88a, 88b are arranged in a corresponding and parallel relationship with one another. For ease of description and illustration, however, the first and second portions 87a, 87b and the first and second tapered ends 88a, 88b will be referred to collectively herein as actuating cams 87 and tapered ends 88, respectively.

Each slide 86 also has an annular seat opening 89 for receiving a neck insert 90. Each neck insert 90 has an annular flange 92 that is mounted in its annular seat opening 89 and fixedly connected to the respective slide 86. Also, since the annular flange 92 of each neck insert 90 is attached to its respective slide 86, each neck insert 90 also splits apart into a first section 90a and a second section 90b as the slide 86 travels along the tapered ends 88 of the respective actuating cams 87. The first section 90a of each neck insert 90 is attached and corresponds to the first section 86a of the respective slide 86, and the second section 90b of each neck insert 90 is attached and corresponds to the second section 86b of the respective slide 86. Preferably, the further the slides 86 travel along the tapered ends 88 of the respective actuating cams 87, the further the first section 90a and the second section 90b of each neck insert 90 are separated from one another.

The neck inserts 90 are also positioned around the elongated stem portions 74 of the mold cores 70 and adjacent to the bases 72 of the mold cores 70. Each neck insert 90 also has an inner surface 94 facing the elongated stem portion 74 of its respective mold core 70. Preferably, the inner surface 94 includes threads 96, as best shown in FIG. 1. In addition, the inner surface 94 of each neck insert 90 and the elongated stem portion 74 of its respective mold core 70 together form and define the remaining portion of the preform cavity 98 between them. As discussed in more detail below, the preform cavity 98 is preferably designed to form a preform 99 from molten material injected into the preform cavity 98.

As shown in FIG. 1, the injection molding apparatus 5 of the present invention also comprises a support plate 100 positioned next to the shuttle plate 52. A wear plate 102 may be positioned between the support plate 100 and the shuttle plate 52 to help prevent damage to the shuttle plate 52 and the support plate 100 during lateral movement of the shuttle plate 52. Like the wear plates 84, preferably, but not necessarily, the wear plate 102 is made out of a resilient, wear-resistant steel, such as bearing bronze.

The support plate 100 has a piston assembly 104 with a piston rod 106 and a hydraulic cylinder 108 slideably mounted on the piston rod 106, as shown in FIG. 1. The hydraulic cylinder 108 has a first collar 110 slideably mounted on the piston rod 106, with a first hydraulic passage 114, and a second collar 112 slideably mounted on the piston rod 106 and spaced from the first collar 110, with a second hydraulic passage 116. The first and second collars 110, 112 are also fixedly attached to the hydraulic couplings, as shown in FIG. 1. Moreover, the first and second hydraulic passages 114, 116 are in fluid communication with the hydraulic couplings 60, and thus the hydraulic channels 56, of the shuttle plate 52. The first and second collars 110, 112 also each have a bushing 118 slideably mounted on the piston rod 106 to prevent the leakage of hydraulic fluid out of the hydraulic cylinder 108 through the first and second collars 110, 112. Preferably, each bushing 118 has one or more seals 120 to further prevent the leakage of hydraulic fluid out of the hydraulic cylinder 108 through the first and second collars 110, 112, and one or more wear bands 122 to prevent excessive wearing of the bushings 118 as the bushings 118 slide along the piston rod 106.

The hydraulic cylinder 108 also has a hydraulic chamber 124 positioned between the first and second collars 110, 112. The hydraulic chamber 124 is in fluid communication with the first and second hydraulic passages 114, 116. The hydraulic cylinder 108 also has a piston 126 slideably mounted on the piston rod 106 within the hydraulic chamber 124. The piston 126 has piston body 128 with one or more seals 130 to prevent hydraulic fluid from flowing around the piston 126, and one or more wear bands 132 to prevent excessive wear of the piston 126 as it slides along the piston rod 106 within the hydraulic chamber 124.

The injection molding apparatus 5 of the present invention further comprises a plurality of riser bars 140 fixedly mounted against the support plate 100 opposite the shuttle plate 52, and also fixedly mounted against a machine platen (not shown). The riser bars 140 are capable of being moved forward toward the cavity plate 22 and backward away from the cavity plate 22 by the machine platen (not shown) to close and open, respectively, the injection molding apparatus 5 of the present invention, as described in more detail below. The injection molding apparatus 5 also comprises an ejector plate 150 slideably mounted on a plurality of injector posts 154 positioned between the riser bars 140. The ejector plate 150 also has a plurality of ejector rods 152 that are fixedly mounted on the ejector plate 150 with bolts 156. Each ejector rod 152 is capable of being aligned with one of the ejector plugs 54, depending on the position of the shuttle plate 52.

The preform cavity 98 may have any number of shapes and configurations depending on the desired product to be molded. As shown in FIGS. 1 and 4–16, the preform cavity 98 preferably, but not necessarily, has the shape of a bottle preform with a threaded end. It should be understood that by altering the preform cavity 98, one may mold other bottle preforms of different shapes and configurations, or products different from bottle preforms, such as closures, and the present invention is not limited to the molding of only the bottle preforms shown or even other types of preforms.

It should also be understood that the apparatus 5 of the present invention, especially its nozzles, may also have one or more heating systems, cooling systems, and insulative air spaces to maintain the proper temperatures for its components and the materials flowing through the apparatus. Examples of suitable heating systems, cooling systems, and insulative air spaces for the apparatus of the present invention are described in U.S. patent application Ser. No. 08/969, 764, entitled "Sprue Gated Five-Layer Injection Molding Apparatus," filed on Nov. 13, 1997 now U.S. Pat. No. 6,062,841, as well as U.S. Pat. Nos. 5,094,603, 5,135,377, and 5,223,275 to Gellert, which are all specifically incorporated in their entirety herein by reference.

The operation of the apparatus of the present invention will now be described with particular reference to FIGS. 1 and 4–16. In particular, the operation of the piston assembly 104 and the movement of the shuttle plate 52 will be described first with reference to FIG. 1, followed by a description of each step of the method and operation of the apparatus 5 of the present invention, which will be referred to with a stage number, as illustrated in FIGS. 4–16. While the formation of only a bottle preform is shown in the drawings and described below, it should be understood that other types of preforms or products different than preforms, such as closures, with varying material characteristics, may be the resulting products of the apparatus and method of the present invention. In addition, although twelve stages are shown in FIGS. 4–16 and described below, more or less stages may be used, depending on the application and their organization, and the present invention should not be limited to these twelve stages. For ease of reference, each of the four molding cores 70 has been numbered in FIGS. 4–16, as well as in FIG. 1, with a "1," "2," "3," or "4." Each of these mold cores 70 will be referred to hereinafter as "mold core 1," "mold core 2," "mold core 3," and "mold core 4," respectively. It should also be understood, that while only four mold cores are shown in FIGS. 4–16, the steps and movements of the depicted mold cores will preferably translate to the other mold cores in the same row.

Referring to FIG. 1, when pressurized hydraulic fluid is introduced into the first hydraulic passage 114 through its respective hydraulic coupling 60 and hydraulic channel 56, the pressurized hydraulic fluid forces the piston 126 to slide along the piston rod 106 toward position B and eventually against the second collar 112. As a result of additional pressurized hydraulic fluid being delivered into the hydraulic chamber 124 from the first hydraulic passage 114, the piston 126 forces the second collar 112 towards position B. This movement of the second collar 112 also forces the shuttle plate 52 towards position B, until its movement is stopped by the stopper 66b, since the second collar 112 is fixedly attached to its respective hydraulic coupling 60, which is in turn fixedly mounted within the shuttle plate 52. On the other hand, when pressurized hydraulic fluid is introduced into the second hydraulic passage 116 from its respective hydraulic coupling 60 and hydraulic channel 56, the pressurized hydraulic fluid forces the piston to slide within the hydraulic chamber 124, along the piston rod 106 toward position A, and eventually against the first collar 110. As a result of additional pressurized hydraulic fluid being delivered into the hydraulic chamber 124 from the second hydraulic passage 116, the piston forces the first collar 110 towards position B. This movement of the first collar 110 also forces the shuttle plate 52 towards position A, until its movement is stopped by the stopper 66a, since the first collar 110 is fixedly attached to its respective hydraulic coupling 60, which is in turn fixedly mounted within the shuttle plate 52. Accordingly, by introducing pressurized hydraulic fluid into either the first or second hydraulic passages 114, 116 (or alternatively by reducing the hydraulic pressure of the other hydraulic passage), the piston assembly 104 of the support plate 100 is capable of laterally moving the shuttle plate 52 back and forth between position A and position B.

Figure 4:
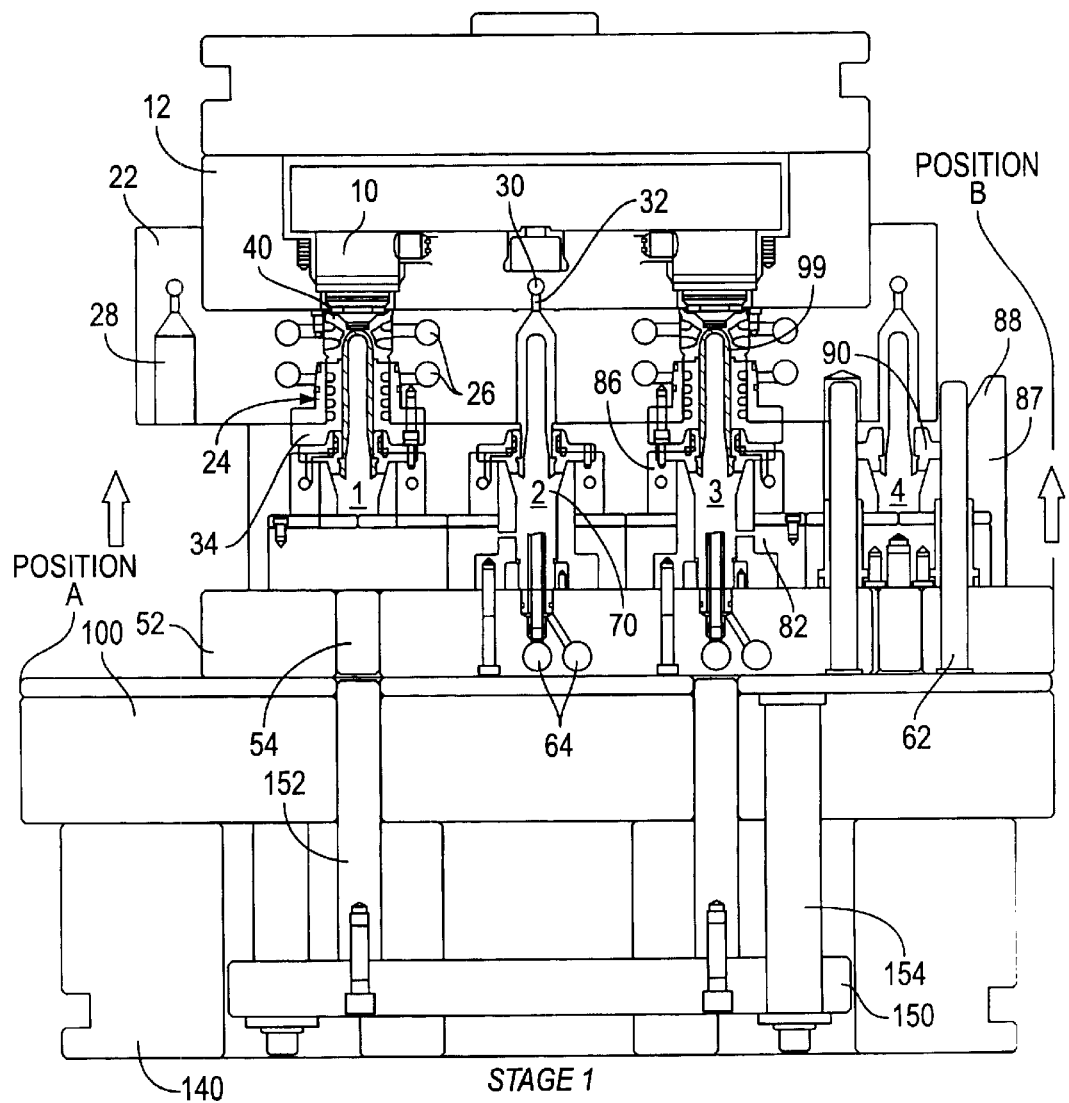
FIG. 4 is a partial top or side cross-sectional view of the injection molding apparatus of FIG. 1, illustrating a first stage of a method of the present invention.

As shown in FIG. 4, stage 1 begins with the injection molding apparatus in a closed position and the shuttle plate in position B. As a result, mold core 1 and mold core 3 are aligned with the nozzles and positioned within the central bores of the cavity inserts and gate inserts located in the injection cavities. In contrast, mold core 2 and mold core 4 are positioned within the cooling chambers closest to position B. One or more molten materials is then injected from the nozzles into the preform cavities around mold core 1 and mold core 3. The mold cores are held in this position for an amount of time sufficient to cool the preforms for movement to the adjacent cooling chambers. Preferably, the external cooling of the preforms in the preform cavities around mold core 1 and mold core 3 is assisted by the cooling fluid, such as cooled water, flowing through the cooling channels and the cooling rings around the cavity insert and the gate insert. In addition, the internal cooling of the preform in the preform cavities around mold core 1 and mold core 3 is preferably assisted by the flow of cooling fluid, such as cooled water, through the cooling passageways of the mold cores from the cooling passages of the shuttle plate.

Figure 5:
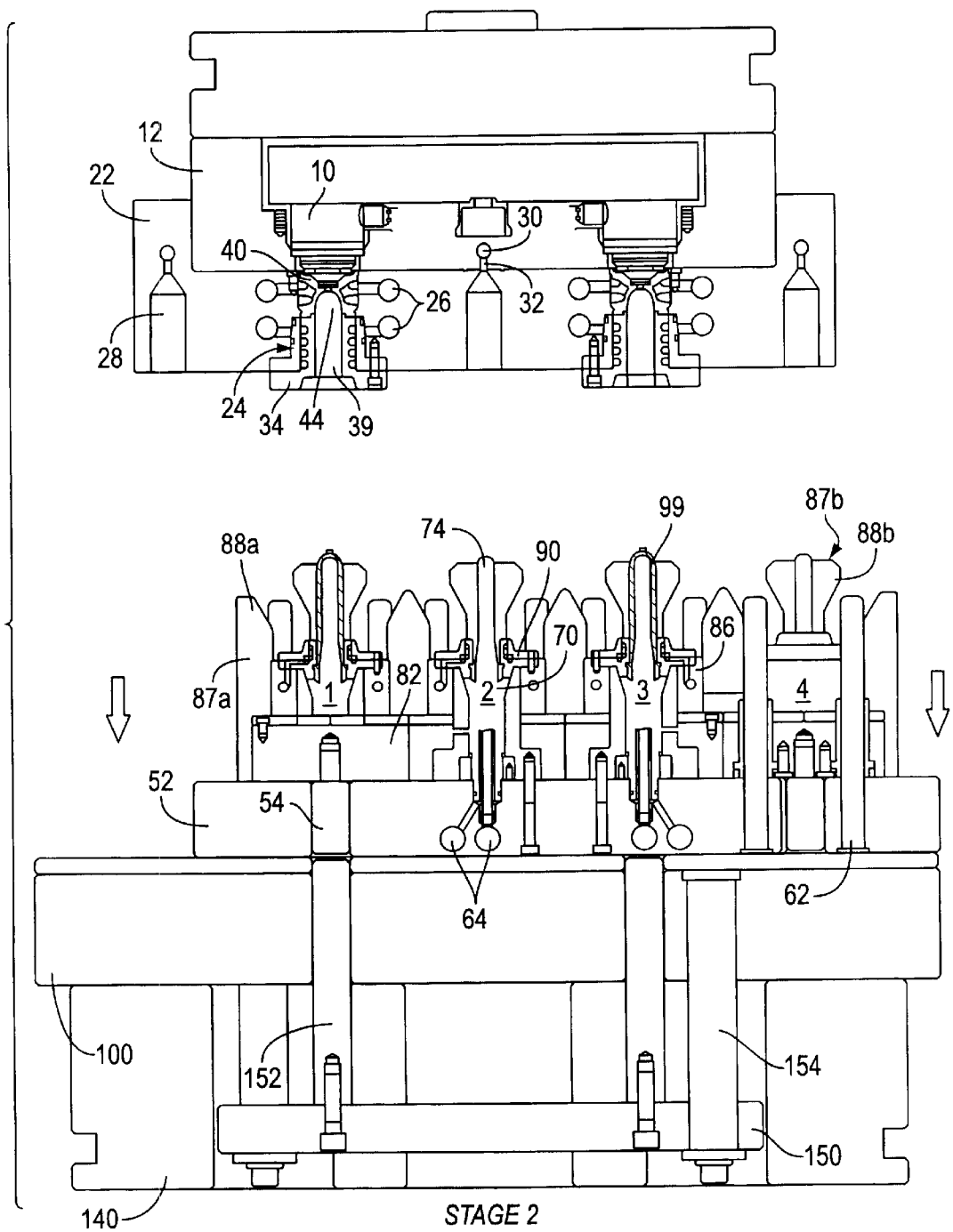
FIG. 5 is a partial top or side cross-sectional view of the injection molding apparatus of FIG. 1, illustrating a second stage of a method of the present invention.

After the preforms have sufficiently cooled in the injection cavities, stage 2 begins with the injection molding apparatus opening and the second mold part moving backward away from the first mold part, as shown in FIG. 5. The injection molding apparatus is moved to this open position by the backward movement of the riser bars. As explained above, the riser bars are connected to the support plate, which in turn is connected to the shuttle plate and the second mold part. Any conventional device known in the art for moving the riser bars, and opening and closing the injection molding apparatus, is suitable for use with the present invention.

Figure 6:
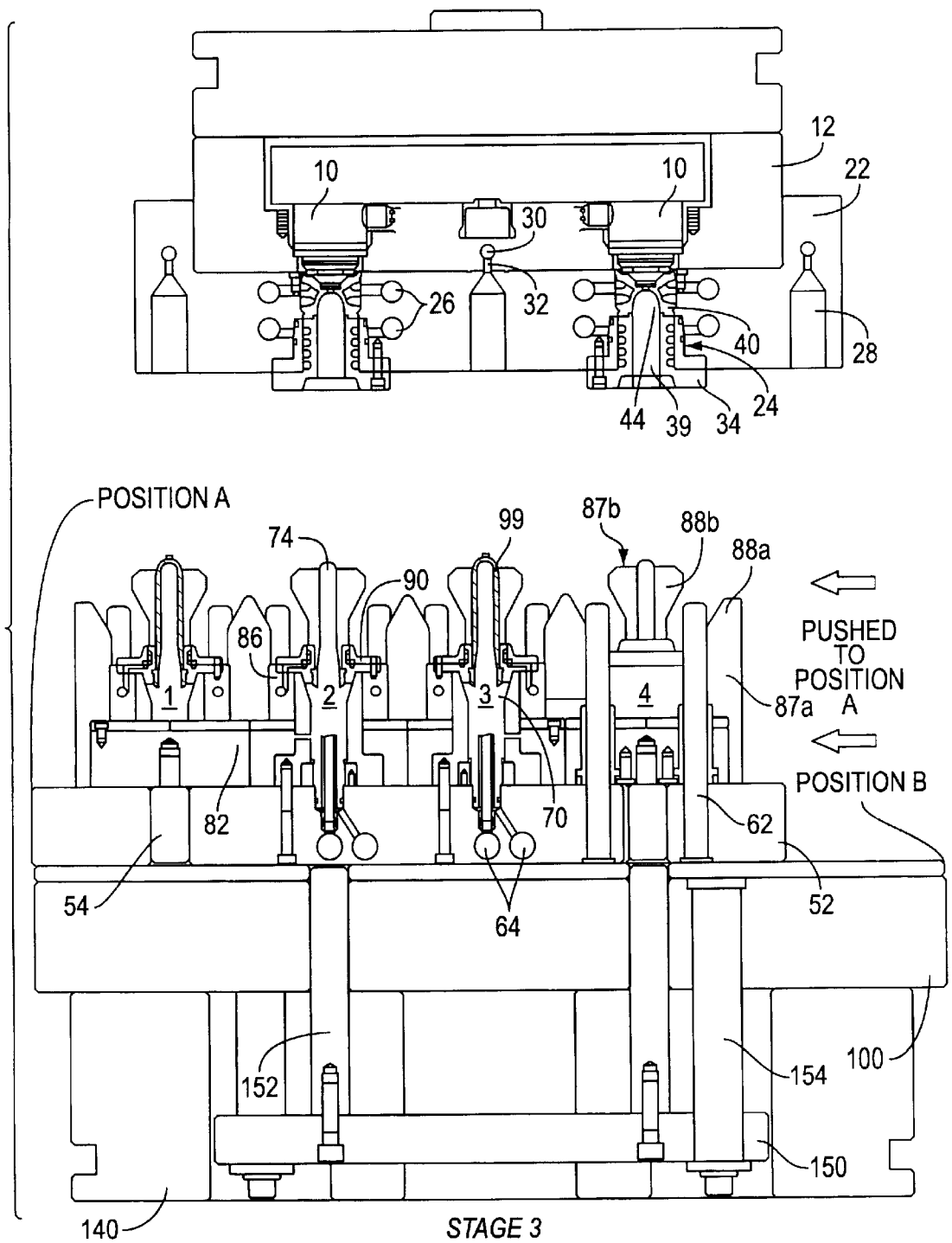
FIG. 6 is a partial top or side cross-sectional view of the injection molding apparatus of FIG. 1, illustrating a third stage of a method of the present invention.

As shown in FIG. 6, stage 3 begins with the shuttle plate being pushed laterally to position A from position B. While the piston assembly is not shown in FIG. 6, it should be understood that the shuttle plate is laterally moved from position B to position A by the piston assembly in the manner previously set forth above. At the end of stage 3, the shuttle plate is in position A, with mold core 2 and mold core 4 aligned with the injection cavities and the nozzles, and mold core 1 and mold core 3 aligned with the cooling chambers located closest to position A.

Figure 7:
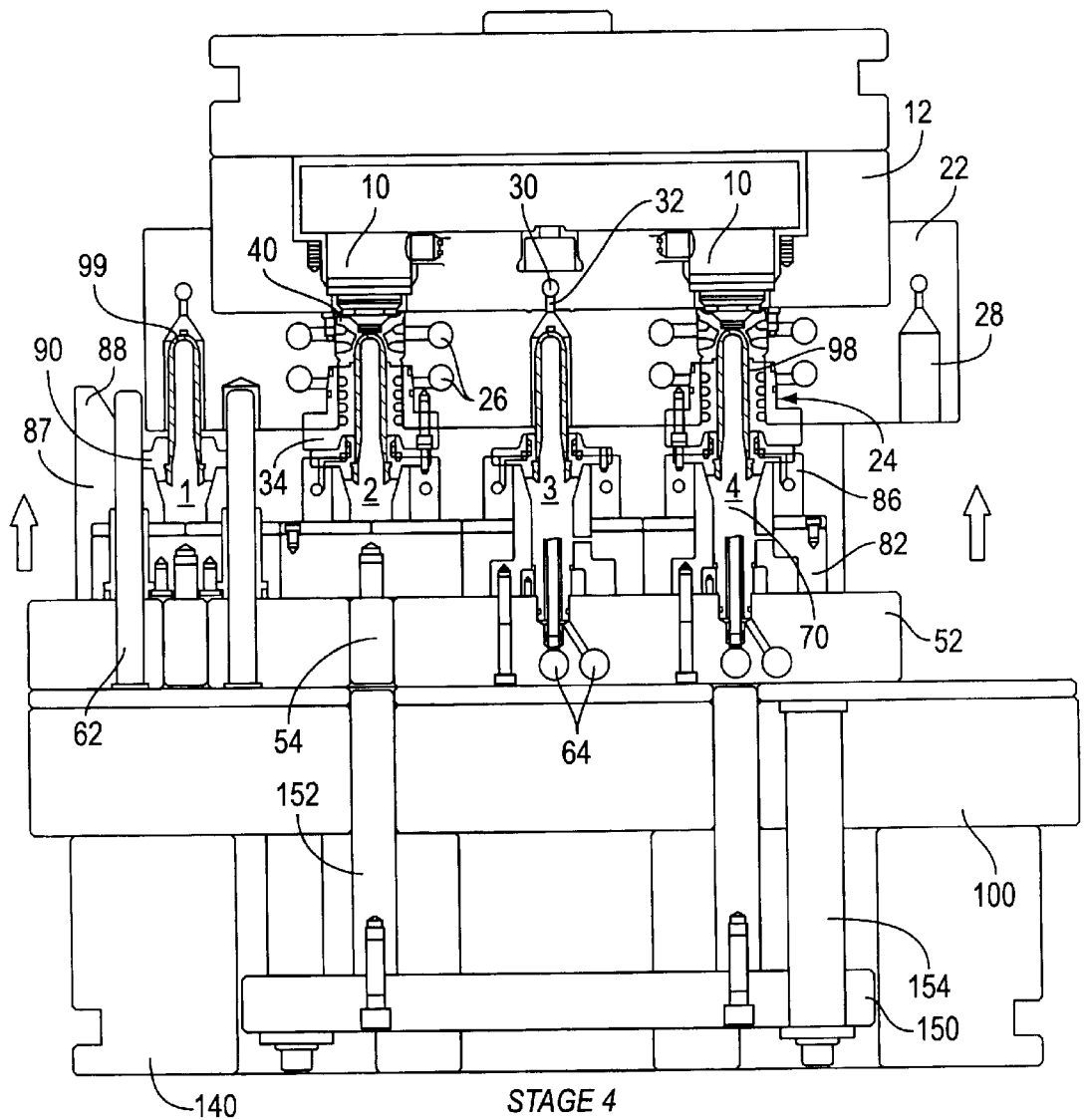
FIG. 7 is a partial top or side cross-sectional view of the injection molding apparatus of FIG. 1, illustrating a fourth stage of a method of the present invention.

Next, in stage 4, the injection molding apparatus is closed by the forward movement of the riser bars, as shown in FIG. 7. As a result, mold core 1 and mold core 3 are inserted within the cooling chambers, and mold core 2 and mold core 4 are inserted in the central bores of the cavity inserts and gate inserts located within the injection cavities. At this point, one or more molten materials are injected from the nozzles into the preform cavities around mold core 2 and mold core 4. At the same time, the preforms on mold core 1 and mold core 3 continue to cool in their respective cooling chambers. The internal and external cooling of these preforms is preferably assisted by the cooling fluid, such as cooled air, flowing through the cooling chambers, and thus around the preforms, from the cooling lines and cooling access lines of the cavity plate, as well as by the cooling fluid, such as cooled water, flowing through the cooling passageways of mold core 1 and mold core 3. After the preform cavities around mold core 2 and mold core 4 have been filled with molten material, they are held in place and allowed to cool for an amount of time sufficient to cool the preforms for movement to the adjacent cooling chambers. Preferably, the external cooling of the preforms in the preform cavities around mold core 2 and mold core 4 is assisted by the cooling fluid, such as cooled water, flowing through the cooling channels and the cooling rings around the cavity insert and the gate insert. In addition, the internal cooling of the preform in the preform cavities around mold core 2 and mold core 4 is assisted by the flow of cooling fluid, such as cooled water, through the cooling passageways of the mold cores from the cooling passages of the shuttle plate. It should be noted that this cooling of the preforms in the preform cavities around mold core 2 and mold core 4 is identical to the cooling of the preforms in the preform cavities around mold core 1 and mold core 3 during stage 1.

Figure 8:
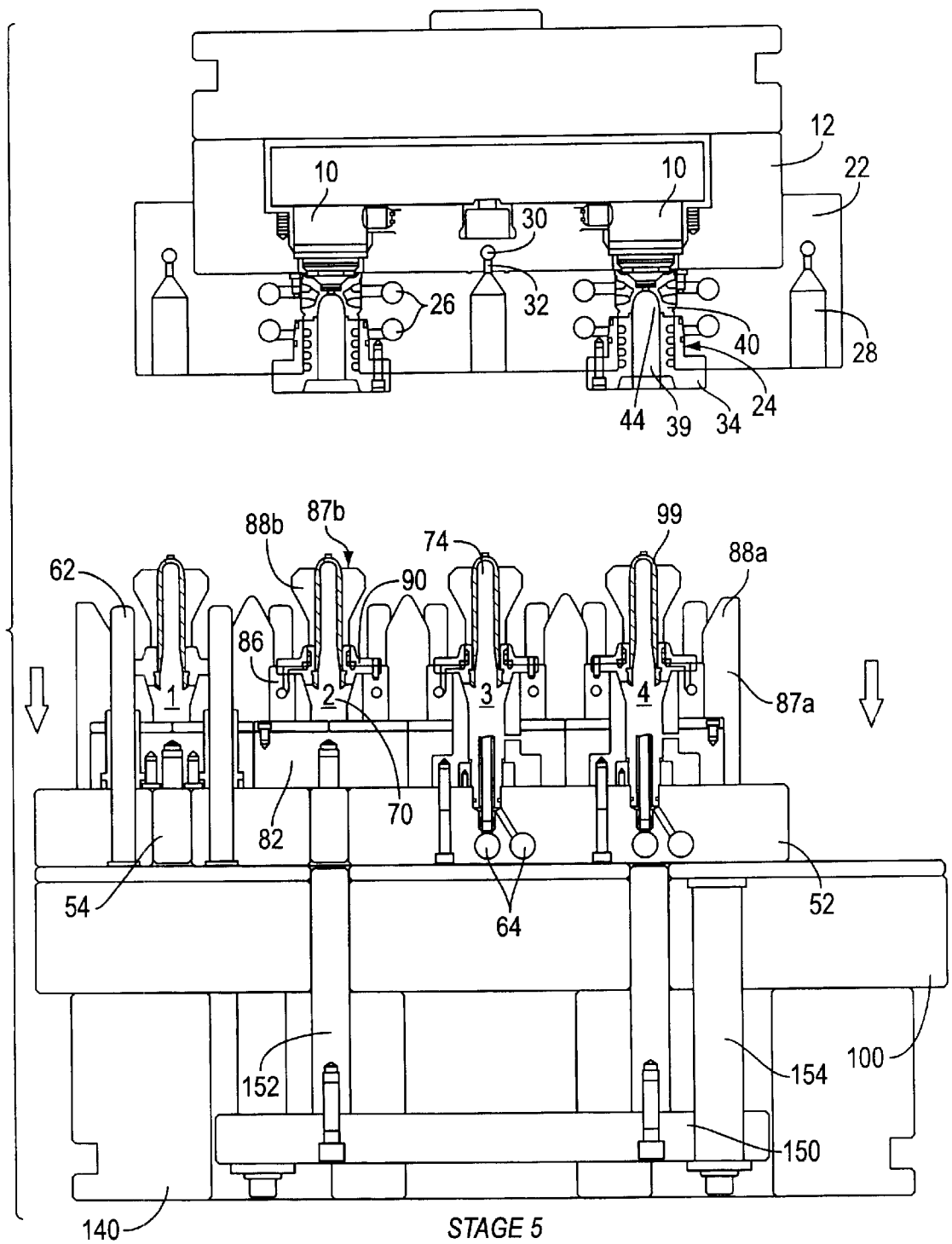
FIG. 8 is a partial top or side cross-sectional view of the injection molding apparatus of FIG. 1, illustrating a fifth stage of a method of the present invention.

As shown in FIG. 8, stage 5 begins with the opening of the injection molding apparatus by the backward movement of the riser bars. This stage is identical to stage 2, except that in stage 5, the shuttle plate is in position A, and preforms now surround all of the mold cores.

Figure 9:
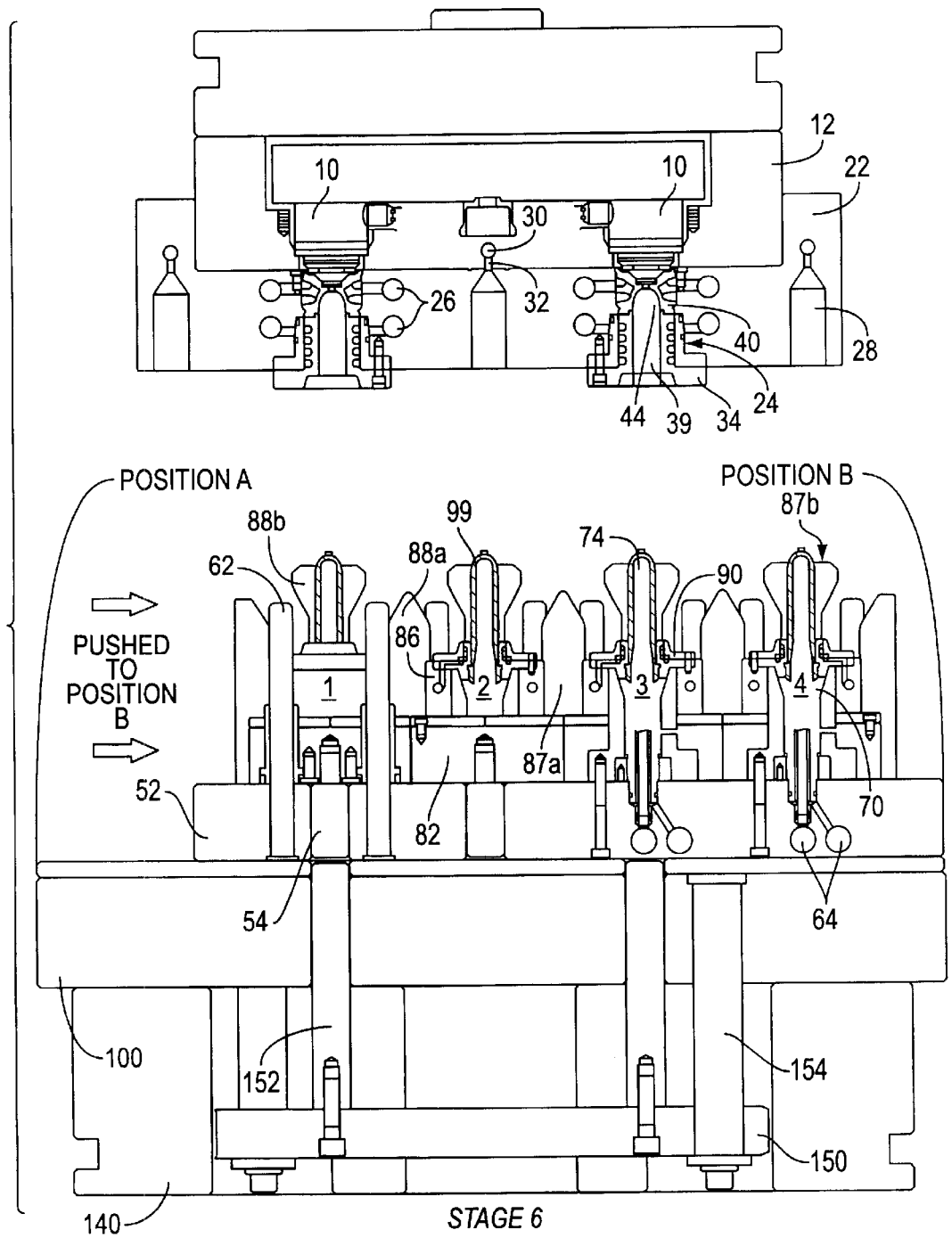
FIG. 9 is a partial top or side cross-sectional view of the injection molding apparatus of FIG. 1, illustrating a sixth stage of a method of the present invention.

In stage 6, the shuttle plate is pushed laterally from position A to position B, as shown in FIG. 9. Similar to stage 3, the shuttle plate is laterally moved by the piston assembly in the manner previously set forth above. As a result, mold core 1 and mold core 3 are now aligned with the nozzles and the cavity inserts and gate inserts located in the injection cavities, while mold core 2 and mold core 4 are aligned with the cooling chambers located closest to position B. In addition, the ejector plugs connected to the stripper plates surrounding mold core 1 and mold core 3 are now aligned with the ejector rods connected to the ejector plate.

Figure 10:
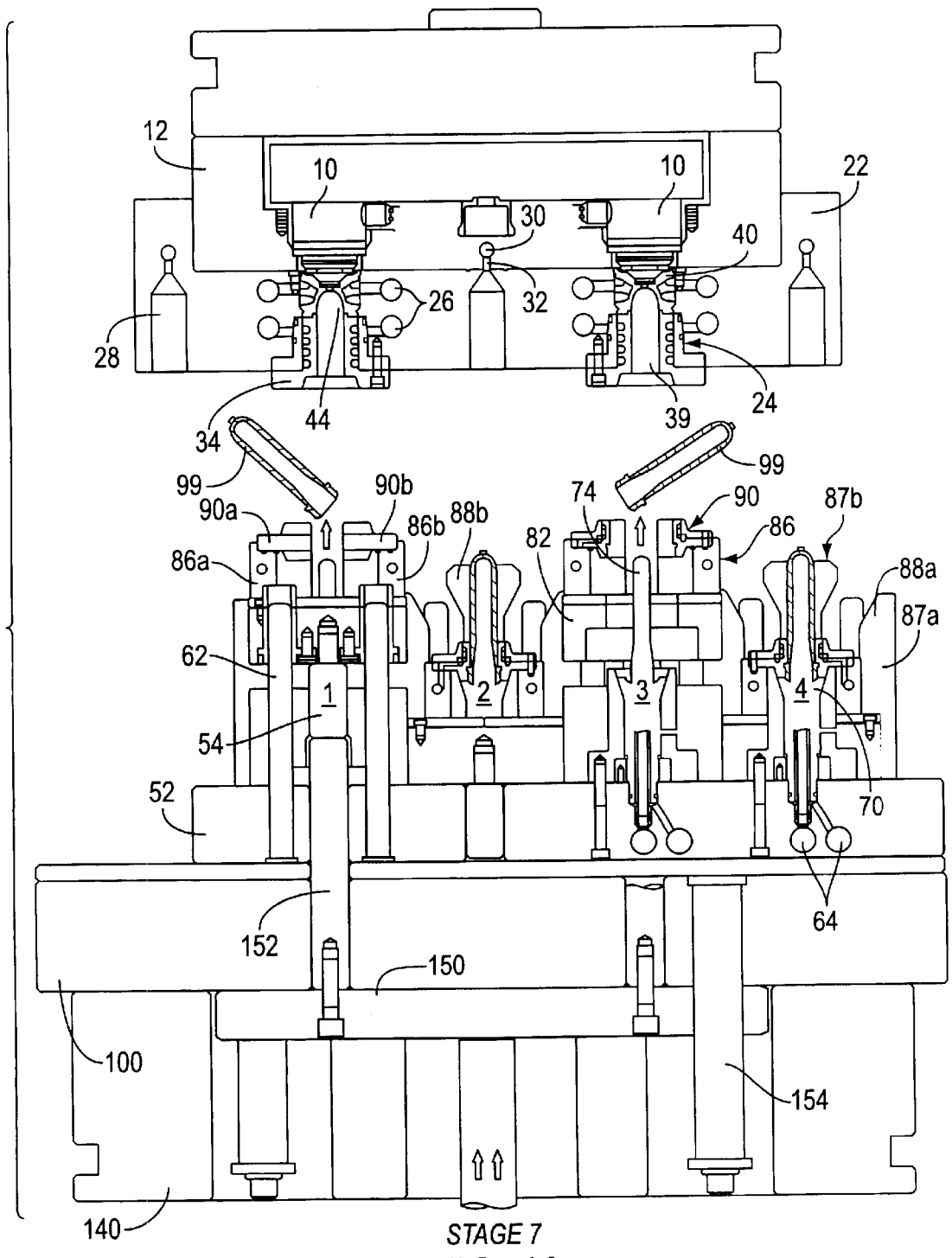
FIG. 10 is a partial top or side cross-sectional view of the injection molding apparatus of FIG. 1, illustrating a seventh stage of a method of the present invention.

As shown in FIG. 10, stage 7 is the first ejection stage. Stage 7 begins with the forward movement of the ejector plate along the ejector posts, thereby causing the aligned ejector plugs to force the stripper plates around mold core 1 and mold core 3 forward toward the cavity plate, along their respective support rods. This movement of the stripper plates also causes the forward movement of the adjacent slides toward the cavity plate, along their respective actuating cams. As shown in FIGS. 10 and 11A–11B, the forward movement of the stripper plates and slides around mold core 1 and mold core 3 causes the neck inserts around these mold cores to also move forward toward the cavity plate. Since part of each preform cavity, and thus each molded preform, is retained within the neck inserts around mold core 1 and mold core 3, the forward movement of the neck inserts towards the cavity plate and away from mold core 1 and mold core 3, also causes the molded preforms to move forward toward the cavity plate and away from the mold cores. As the slides around mold core 1 and mold core 3 continue to move upward along the tapered ends 88 of their respective actuating cams 87, the slides, as well as the neck inserts attached to the slides, begin to separate apart into their first and second sections. Consequently, the molded preforms are freed and ejected from the second mold part and its neck inserts, thereby permitting the molded preforms to freely fall away from the injection molding apparatus, or to be removed by a robot device, as discussed in more detail below.

Figure 12:
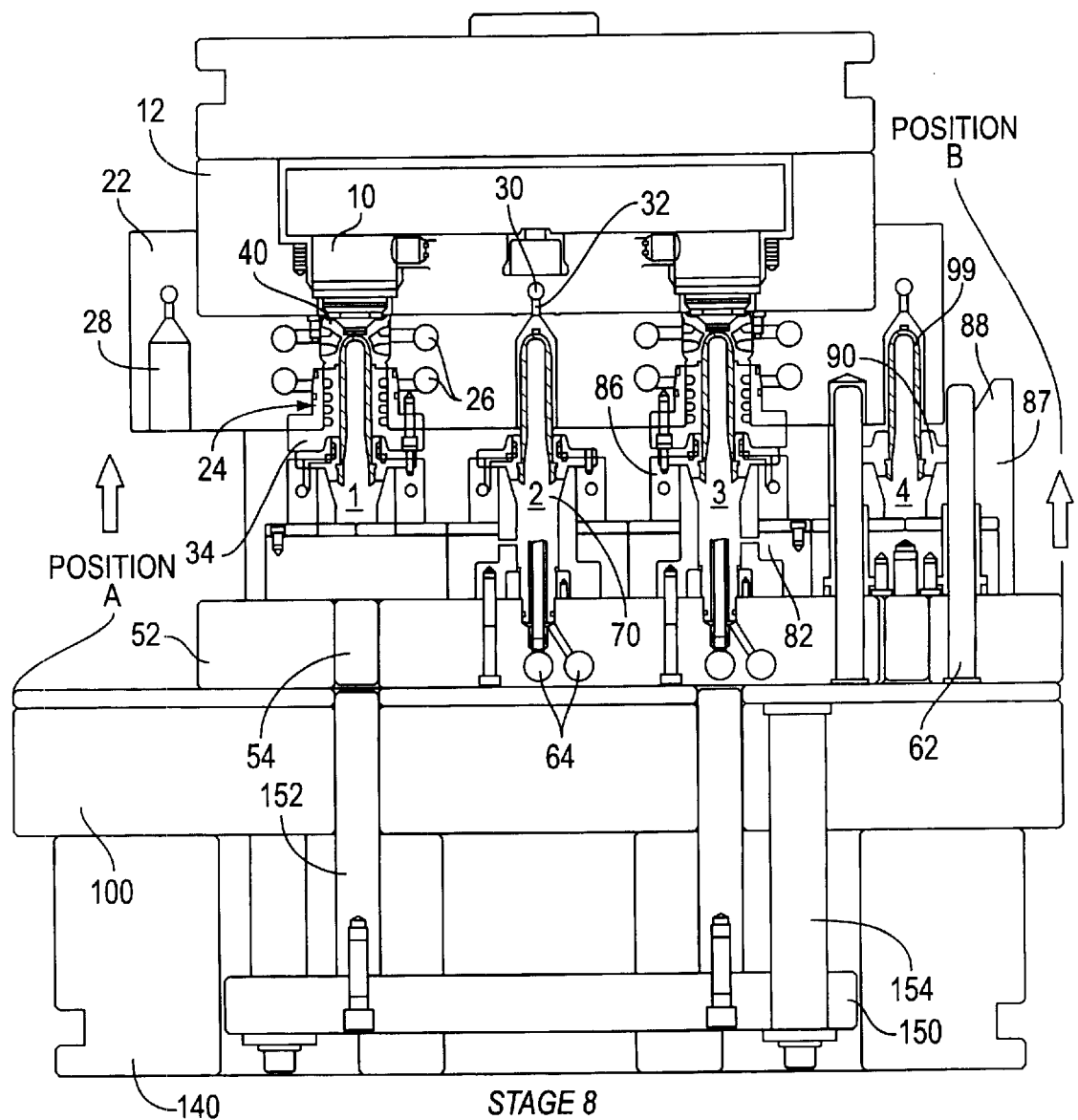
FIG. 12 is a partial top or side cross-sectional view of the injection molding apparatus of FIG. 1, illustrating an eighth stage of a method of the present invention.

After the preforms on mold core 1 and mold core 3 are ejected from the injection molding apparatus, and the neck inserts, the slides, the stripper plates, and the ejector plugs are retracted away from the cavity plate by the backward movement of the ejector plate and ejector rods, the next step is stage 8, which is shown in FIG. 12. Similar to stage 1, in stage 8, the injection molding apparatus is once again closed with the shuttle plate in position B. In addition, mold core 1 and mold core 3 are inserted into the central bores of the cavity inserts and gate inserts located in the injection cavities, while mold core 2 and mold core 4 are inserted into the cooling chambers located closest to position B. Just like stage 1, the preform cavities around mold core 1 and mold core 3 are filled with one or more molten materials from the nozzles. Likewise, while the preform cavities around mold core 1 and mold core 3 are being filled with molten material, they are being cooled externally by the cooling channels and cooling rings around the cavity inserts and the gate inserts, as well as internally by the cooling passageways of mold core 1 and mold core 3, for a period of time sufficient to cool the performs for movement to adjacent cooling chambers. On the other hand, the performs on core 2 and core 4 continue to cool within their cooling chambers with the assistance of the cooling fluid, such as cooled air, flowing through the cooling lines and cooling access lines in the cavity plate, as well as the cooling fluid, such as cooled water, flowing through the cooling passageways of mold core 2 and mold core 4. It should be understood that from the time the preform cavities are filled with molten material, the preforms continue to cool throughout the entire operation of the injection molding apparatus (i.e., while in the injection and cooling chambers, as well as during shuttling), until they are ultimately ejected and removed from the injection molding apparatus.

Figure 13:
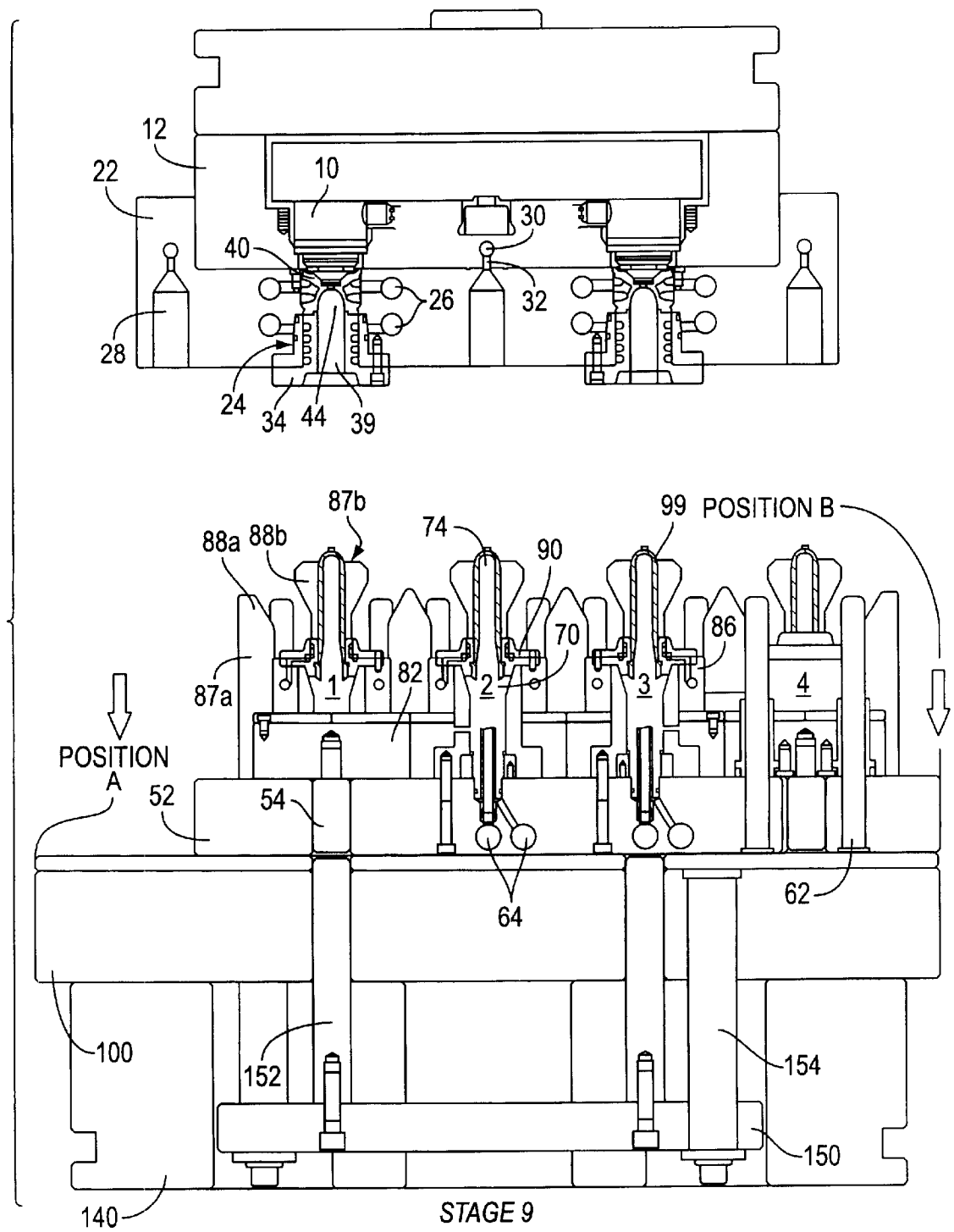
FIG. 13 is a partial top or side cross-sectional view of the injection molding apparatus of FIG. 1, illustrating a ninth stage of a method of the present invention.

Next, the injection molding apparatus is once again opened in stage 9, as shown in FIG. 13. Stage 9 is identical to stage 5, with the exception that the shuttle plate in stage 9 is in position B, rather than position A.

Figure 14:
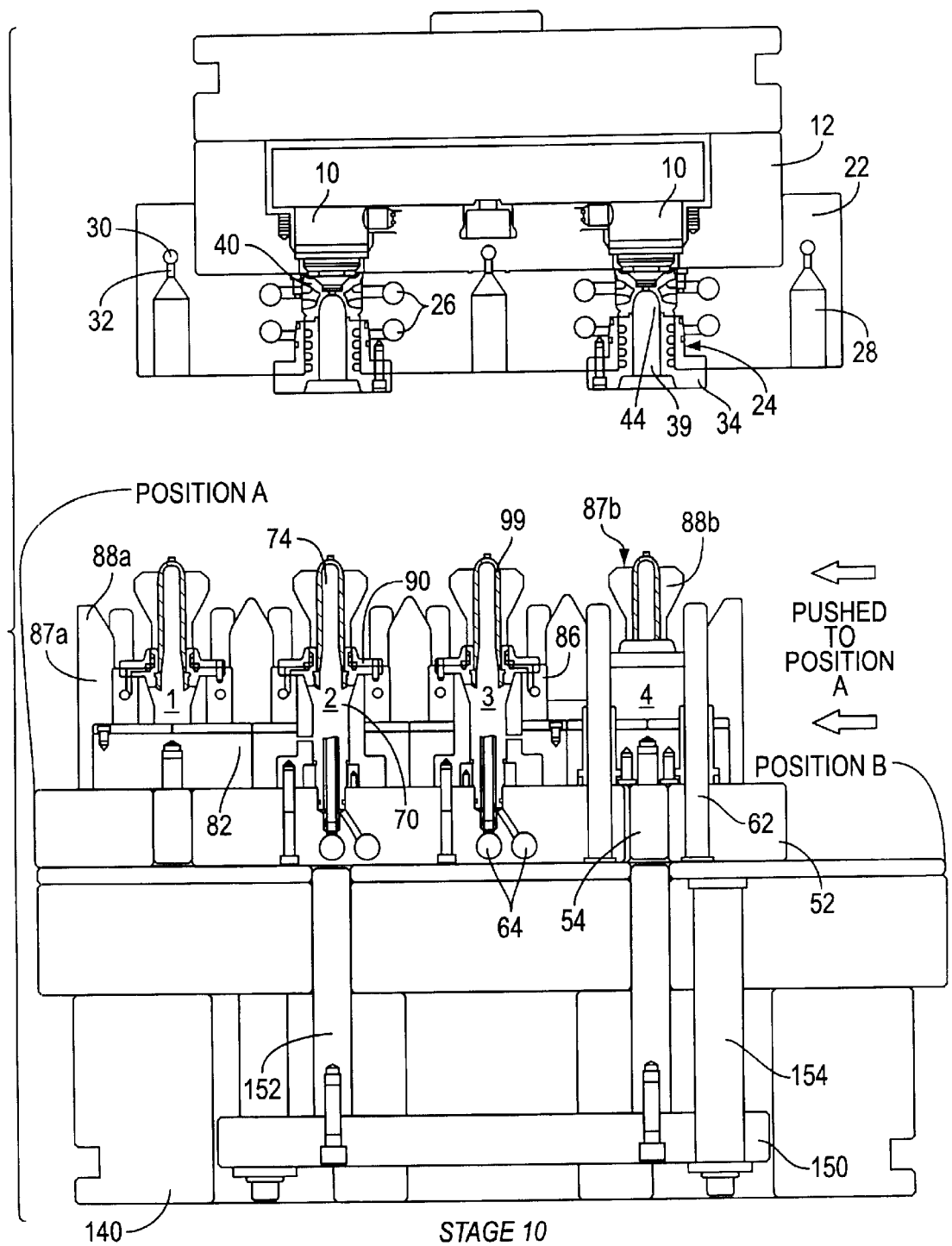
FIG. 14 is a partial top or side cross-sectional view of the injection molding apparatus of FIG. 1, illustrating a tenth stage of a method of the present invention.

In stage 10, the shuttle plate is then moved laterally from position B to position A by the piston assembly, as shown in FIG. 14. Stage 10 is identical to stage 6, with the exception that the shuttle plate is being moved in the opposite direction in stage 10, namely from position B to position A, rather than from position A to position B. As a result of this movement of the shuttle plate to position A, the ejector plugs attached to the stripper plates surrounding mold core 2 and mold core 4 are now aligned with the ejector rods connected to the ejector plate. In addition, mold core 2 and mold core 4 are now aligned with the central bores of the cavity inserts and the gate inserts located in the injection cavities, while mold core 1 and mold core 3 are now aligned with the cooling chambers located closest to position A.

Figure 15:
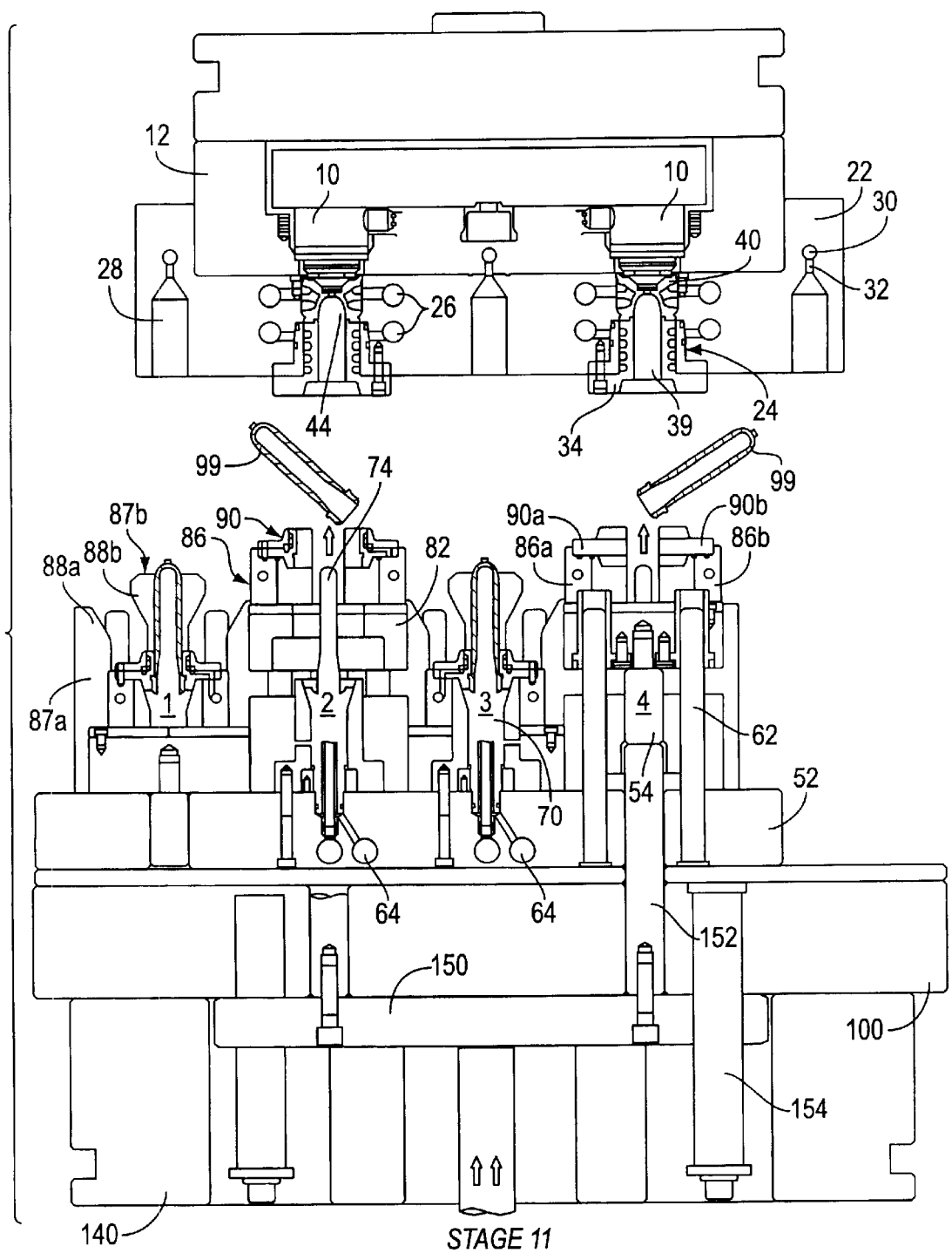
FIG. 15 is a partial top or side cross-sectional view of the injection molding apparatus of FIG. 1, illustrating an eleventh stage of a method of the present invention.

In stage 11, the preforms on mold core 2 and mold core 4 are ejected from the injection molding apparatus, as shown in FIG. 15. Stage 11 (i.e., the second ejection stage) is identical to stage 7, with the exception that in stage 11, the molded preforms on mold core 2 and mold core 4 are ejected from the injection molding apparatus, rather than the molded preforms on mold core 1 and mold core 3. Accordingly, the ejector plate moves forward along the ejection posts, thereby forcing the ejector plugs and their respective stripper plates around mold core 2 and mold core 4 forward toward the cavity plate. Similar to stage 6, the forward movement of the stripper plates also causes the adjacent slides to move forward toward the cavity plate, along their respective actuating cams. As the stripper plates around mold core 2 and mold core 4 travel along the tapered ends of their respective actuating cams, the slides, as well as their attached neck inserts, separate apart into their first and second sections. With the first and second sections of the neck inserts spaced apart from one another, the molded preforms from mold core 2 and mold core 4 are free to be ejected from the injection molding apparatus. At this point, the molded preforms from mold core 2 and mold core 4 either freely fall away from the injection molding apparatus, or are taken away by a robot device, as described in more detail below.

Figure 16:
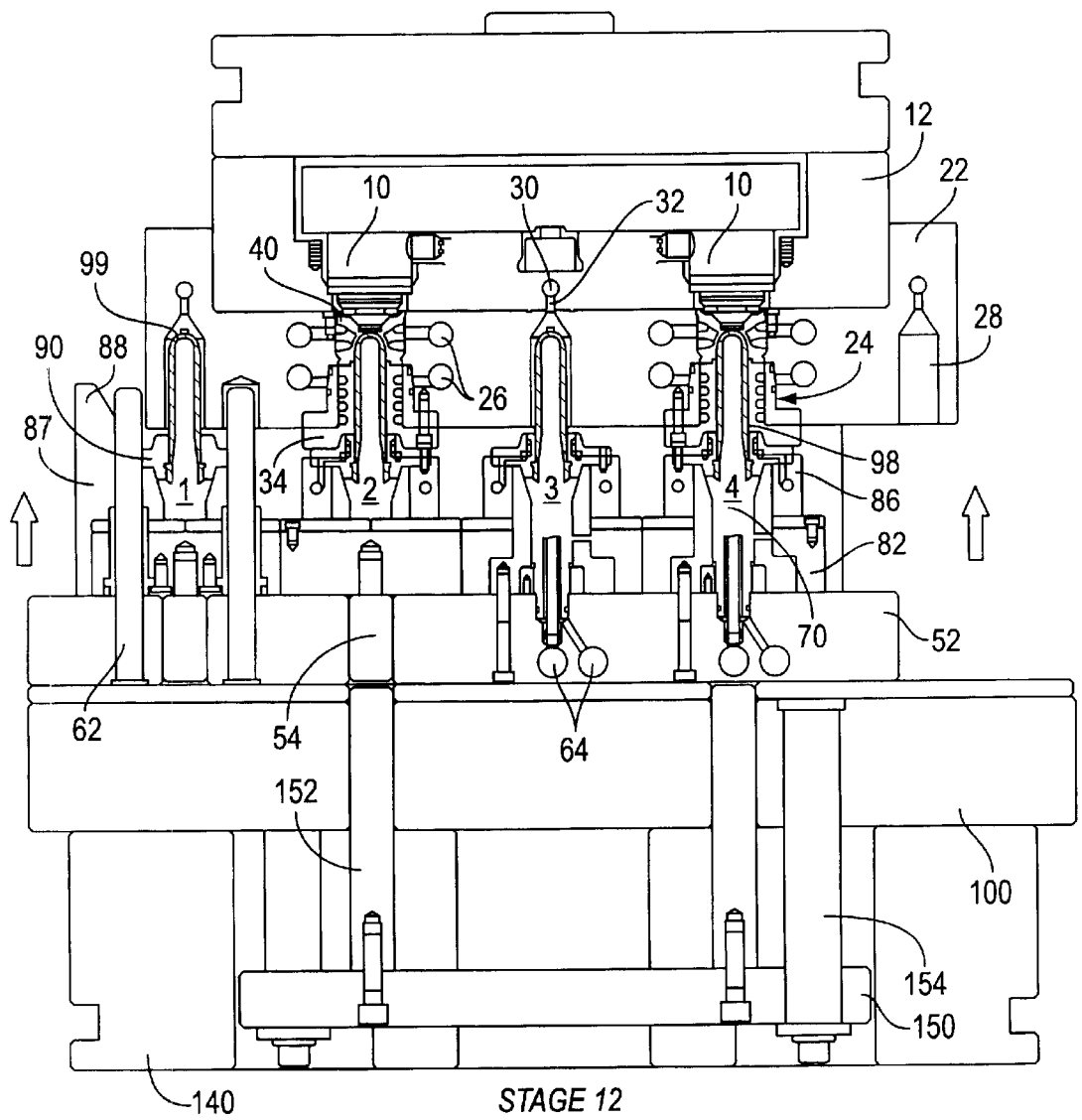
FIG. 16 is a partial top or side cross-sectional view of the injection molding apparatus of FIG. 1, illustrating a twelfth stage of a method of the present invention.

Finally, in stage 12, the injection molding apparatus is once again closed by the forward movement of the riser bars, with the shuttle plate in position A, as shown in FIG. 16. Stage 12 is identical to stage 4. Accordingly, the method of the present invention continues with stage 4, and the production cycle for the preforms is repeated until the desired number of preforms has been molded.

Figure 17:
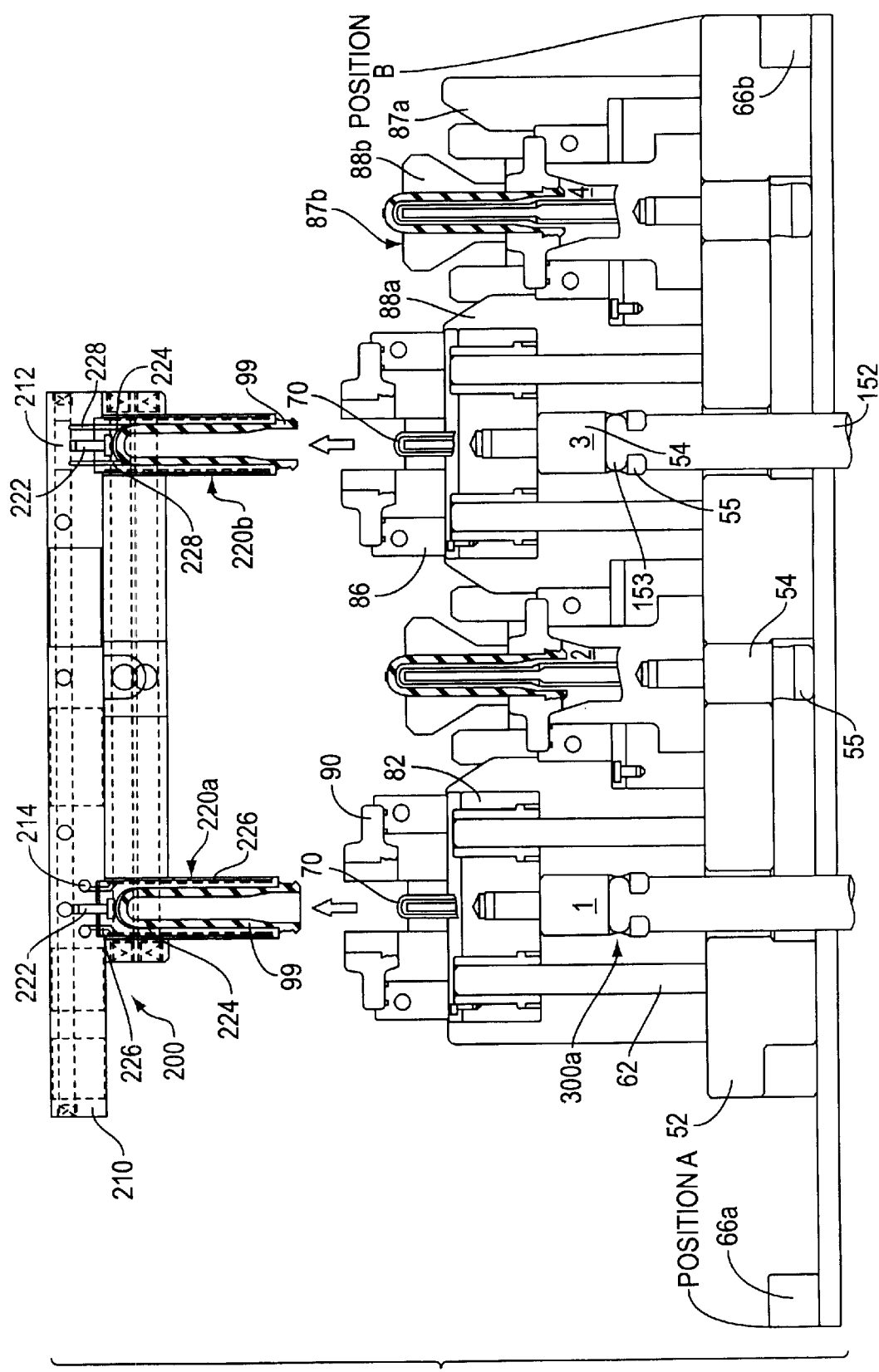
FIG. 17 is a partial top or side cross-sectional view of a robot device, an ejector slide lock, and the injection molding apparatus of FIG. 1, with a shuttle plate in position B.
Figure 18:
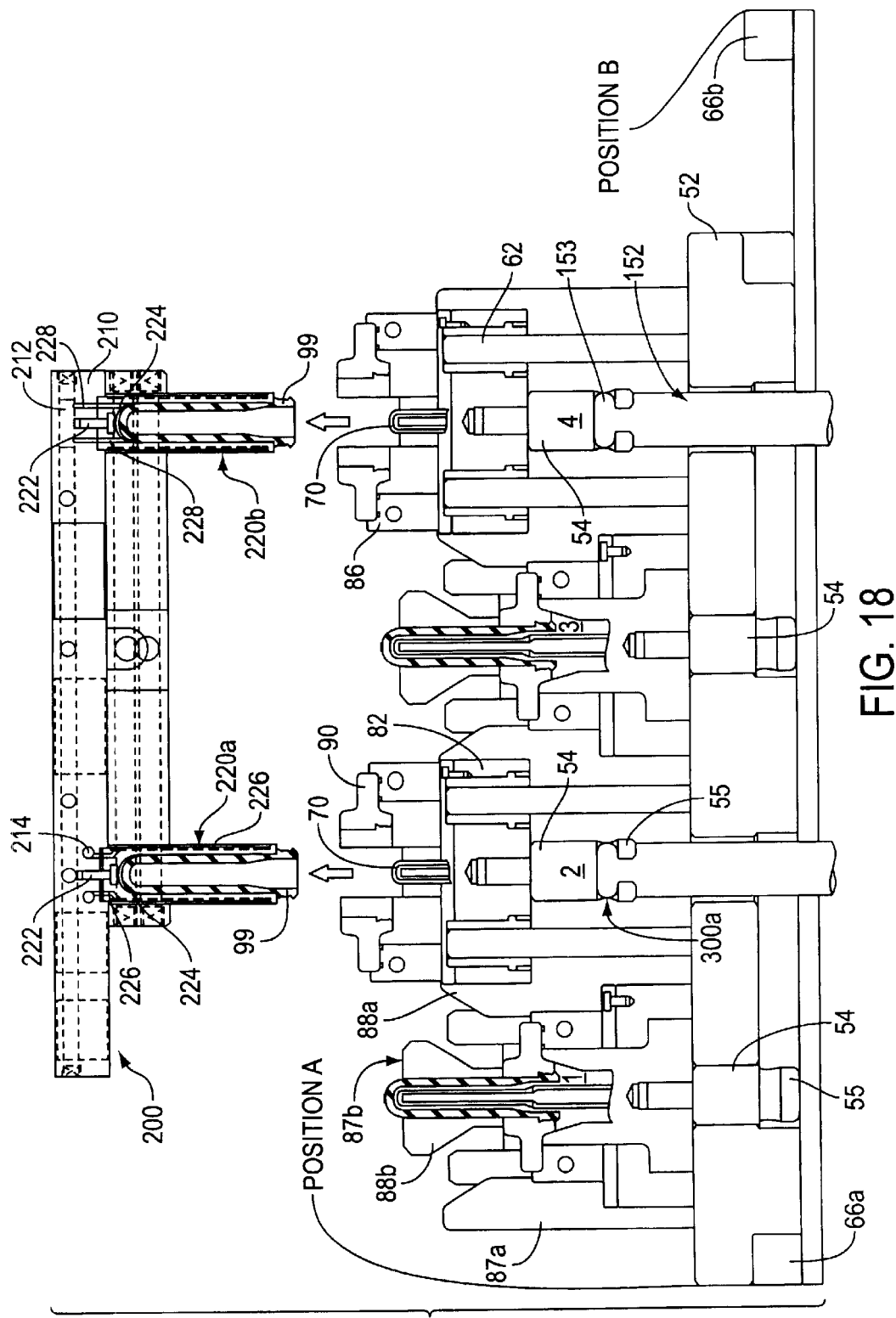
FIG. 18 is a partial top or side cross-sectional view of the robot device of FIG. 17, the ejector slide lock of FIG. 17, and the injection molding apparatus of FIG. 1, with the shuttle plate in position A.
Figure 19:
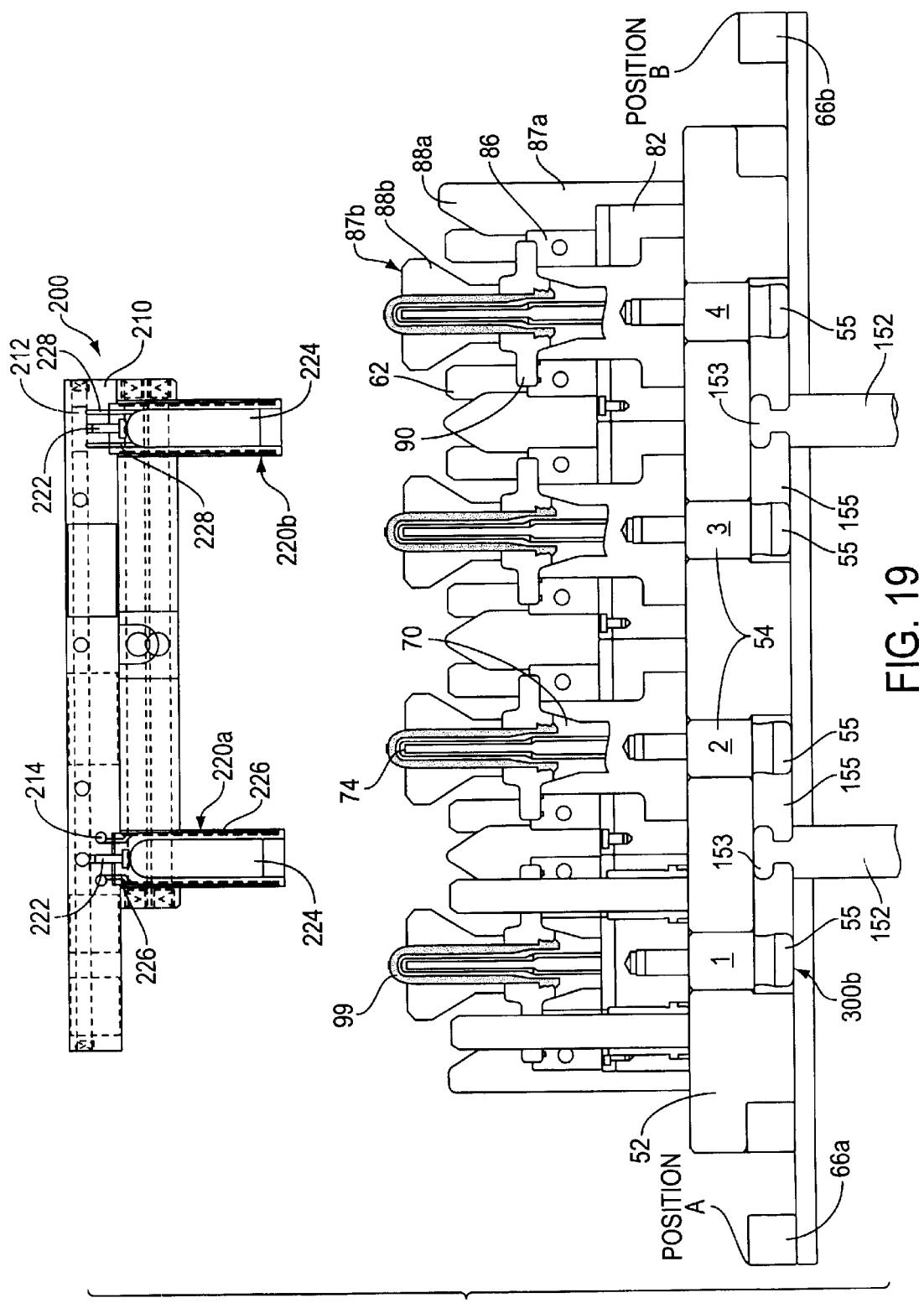
FIG. 19 is a partial top or side cross-sectional view of the robot device of FIG. 17, another embodiment of an ejector slide lock, and the injection molding apparatus of FIG. 1, with the shuttle plate between position A and position B.

A preferred embodiment of a robot device 200 for removing and carrying away molded preforms or other products from the injection molding apparatus 5 is shown in FIGS. 17–19. The robot device 200 comprises a take out plate 210 with a plurality of air passages 212 connected to a pneumatic source (not shown), and a plurality of cooling passages 214 for the flow of cooling fluid, such as cooled water. The robot device 200 also comprises a plurality of arms 220a, 220b connected to the take out plate 210 with bolts 222. Preferably, there is an arm 220a, 220b for each injection cavity 24. In addition, each arm 220a, 220b preferably has a central bore 224 for receiving a molded preform or other product, and a plurality of cooling channels 226 extending throughout the arm. The cooling channels 226 are in communication with the cooling passages 214, and help cool the molded preform or other product retained within the central bores 224 of the arms 220a, 220b. Each arm 220a, 220b also preferably has a plurality of air channels 228 in communication with both the air passages 212 and the central bores 224 of the arms 220a, 220b.

During operation of the injection molding apparatus 5 of the present invention, the robot device may be introduced into the apparatus between stage 6 and stage 7. As shown in FIG. 17, one arm 220a is aligned with mold core 1, and another arm 220b is aligned with mold core 3. As the molded preforms are ejected from mold core 1 and mold core 3 in stage 7, the preforms are pushed into the central bores 224 of the arms 220a, 220b. The preforms are retained in the central bores 224 by the application of a negative pneumatic pressure from the air passages 212 and through the air channels 228. While the preforms are retained in the central bores 224, the preforms are cooled by the cooling fluid, such as cooled water, flowing through the cooling channels 226 of the arms 220a, 220b from the cooling passages 214 of the take out plate 210. Next, the robot device 200 is linearly or rotationally retracted away from the injection molding apparatus 5 before stage 8 begins. Although not shown, the molded preforms may then be carried over to a removal conveyor for further processing, and released from the arms 220a, 220b by the application of a positive pneumatic pressure from the air passages 212 and through the air channels 228.

During operation of the injection molding apparatus 5 of the present invention, the robot device may also be introduced into the apparatus between stage 10 and stage 11. As shown in FIG. 18, one arm 220a is aligned with mold core 2, and another arm 220b is aligned with mold core 4. As the molded preforms are ejected from mold core 2 and mold core 4 in stage 11, the preforms are pushed into the central bores 224 of the arms 220a, 220b. The preforms are retained in the central bores 224 by the application of a negative pneumatic pressure from the air passages 212 and through the air channels 228. While the preforms are retained in the central bores 224, the preforms are cooled by the cooling fluid, such as cooled water, flowing through the cooling channels 226 of the arms 220a, 220b from the cooling passages 214 of the take out plate 210. Next, the robot device 200 is linearly or rotationally retracted away from the injection molding apparatus 5 before stage 12 begins. Although not shown, the molded preforms may then be carried over to a removal conveyor for further processing, and released from the arms 220a, 220b by the application of a positive pneumatic pressure from the air passages 212 and through the air channels 228.

Also shown in FIGS. 17–18 is an embodiment of an ejector slide lock 300a for use with the ejector plugs 54 and the ejector rods 152 of the injection molding apparatus 5. The ejector slide lock 300a comprises a receptacle end 55 attached to each ejector plug 54 opposite each stripper plate 82, and a plug end 153 attached to each ejector rod 152 opposite the ejector plate 150. Preferably, the receptacle end 55 and the plug end 153 are integrally formed with the ejector plug 54 and the ejector rod 152, respectively. Moreover, the receptacle end 55 is adapted to removably receive the plug end 153.

During operation of the injection molding apparatus 5 and the ejector slide lock 300a, as the ejector rods 152 are pushed forward toward the cavity plate 22 by the ejector plate 150, the plug ends 153 snap and lock into the aligned receptacle ends 55 to connect the ejector rods 152 to their respective ejector plugs 54. After the ejector plugs 54 are once again positioned in their respective ejector bores 53, however, the continued backward movement of the ejector rods 152 away from the cavity plate 22 causes the plug ends 153 to snap out of the receptacle ends 55. As a result, the ejector rods 152 and the ejector plugs 54 are separated, and the ejector rods 152 are free to align themselves with another set of ejector plugs 54.

Another embodiment of an ejector slide lock 300b is shown in FIG. 19. The ejector slide lock 300b is identical to the ejector slide lock 300a, except in its operation. Instead of relying on the pushing of the ejector rods 152 forward toward the cavity plate 22 to snap and lock the plug ends 153 into the aligned receptacle ends 55, the ejector slide lock 300b uses the lateral movement of the shuttle plate 52 to snap and lock the plug ends 153 into the aligned receptacle ends 55. As shown in FIG. 19, a plurality of ejector slots 155 are provided in the shuttle plate 52 to allow the shuttle plate 52 to laterally slide between position A and position B over the plug ends 153 of the ejector rods 152, which preferably protrude into the ejector slots 155. Each ejector slot 155 is preferably in communication with both the plug end 153 of an ejector rod 152, and the receptacle ends 55 of the ejector plugs 54 that are actuated by the ejector rod 152.

During operation of the injection molding apparatus 5 and the ejector slide lock 300b, as the shuttle plate 52 (and thus the receptacle ends 55 of the ejector plugs 54) is laterally moved to position A, the plug ends 153 of the ejector rods 152 are forced and locked into the receptacle ends 55 of the ejector plugs 54 corresponding to mold core 2 and mold core 4. On the other hand, as the shuttle plate 52 is laterally moved to position B, the plug ends 153 of the ejector rods 152 are forced out of, and unlocked from, the receptacle ends 55 of the ejector plugs 54 corresponding to mold core 2 and mold core 4, and forced and locked into the receptacle ends 55 of the ejector plugs 54 corresponding to mold core 1 and mold core 3. As a result, the ejector rods 152 are connected to, and disconnected from, their respective ejector plugs 54 by the lateral movement of the shuttle plate 52 (and thus the ejector plugs 54), rather than by the forward and backward movement of the ejector plate 150.

The apparatus and method of the present invention may be applied with particular advantage to both preforms and closures for bottles or containers. The preforms and closures molded with the apparatus and method of the present invention may also have one or more layers, depending on the desired application. The apparatus and method of the present invention also provides a shuttling system that can be readily implemented into standard injection molding apparatus, as opposed to specially designed injection molding apparatus. As a result, the apparatus and method of the present invention may also be applied with particular advantage to existing injection molding apparatus. By simply replacing the cavity plate and the mold parts of the existing injection molding apparatus with the cavity plate, the mold parts, and the support plate of the present invention, the existing injection molding apparatus may be converted into the apparatus of the present invention, and utilized in accordance with the method of the present invention.

It should also be readily apparent from the foregoing description and accompanying drawings that the injection molding apparatus and method of the present invention are an improvement over the prior art. For instance, the apparatus and method of the present invention utilize a shuttle system that has a simple, non-pneumatic ejection mechanism, which does not require a multi-step process. In addition, the shuttling system of the present invention provides proper support for its molded products during shuttling by retaining the molded products on the mold cores. The shuttling system of the present invention also provides proper cooling, both internally via the cooling passageways of the mold cores and externally via the cooling lines and cooling access lines of the cooling chambers, for the molded products before their ejection. Moreover, the shuttling system of the present invention ensures a minimum cycle or production time, since new products can be molded while other molded products are being cooled. Furthermore, the shuttling system of the present invention maximizes cooling time for the products to be molded, since the molded products continue to cool throughout the shuttling operation, from the time material is injected into the cavities until the molded products are finally ejected from the injection molding apparatus. With the use of a robot device, the molded products may also continue to cool further while they are taken away from the injection molding apparatus, maximizing cooling time for the products to be molded. Consequently, the apparatus and method of the present invention provide high-quality injection molded products that are produced with short cycle times.

Those skilled in the art to which the invention pertains may make modifications in other embodiments employing the principles of this invention without departing from its spirit or essential characteristics, particularly upon considering the foregoing teachings. Accordingly, the described embodiments are to be considered in all respects only as illustrative, and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art, yet still fall within the scope of the invention.

What is claimed is:

1. An injection molding apparatus for molding products comprising:
   at least one nozzle for injecting a molten material;
   a first mold part having at least one injection cavity for receiving molten material, the at least one injection cavity being aligned and in fluid communication with the at least one nozzle, the first mold part also having at least a pair of cooling chambers flanking the at least one injection cavity; and
   a second mold part having a laterally moveable shuttle plate with a first mold core, a second mold core, and at least one hydraulic channel, the first and second mold cores for being aligned with and inserted into both the at least one injection cavity and the cooling chambers, the second mold part also having a support plate for supporting the shuttle plate positioned adjacent the shuttle plate, the support plate has within itself a piston assembly with a piston rod and a hydraulic cylinder slideably mounted on the piston rod, the hydraulic cylinder having a first and a second collar slideably mounted on the piston rod, the first and second collars being connected to the shuttle plate and being in fluid communication with the at least one hydraulic channel, the hydraulic cylinder also having a hydraulic chamber positioned between the first and second collars, the hydraulic chamber having a piston slideably mounted on the piston rod between the first and second collars, the piston for pushing against the first and second collars to force the shuttle plate connected to the first and second collars to move back and forth laterally;
   wherein the piston is moved between the first and second collar by forcing pressurized hydraulic fluid into the at least one hydraulic channel.

2. The injection molding apparatus of claim 1 wherein a product can be formed on one of the mold cores in the at least one injection cavity, while a further product is simultaneously cooled on another mold core in one of the cooling chambers.

3. The injection molding apparatus of claim 2 further comprising a first ejection mechanism for the first mold core and a second ejection mechanism for the second mold core, the first ejection mechanism capable of being actuated independently of the second ejection mechanism.

4. A shuttling system for an injection molding apparatus comprising:
   a first mold part having a cavity plate with at least one injection cavity positioned between at least a pair of cooling chambers;

a second mold part having a laterally moveable shuttle plate, a first mold core, a second mold core, a first hydraulic coupling, a second hydraulic coupling, a first hydraulic channel connected to the first hydraulic coupling, and a second hydraulic channel connected to the second hydraulic coupling, the first and second mold cores for being aligned with and inserted into both the at least one injection cavity and the cooling chambers, the second mold part also having a support plate for supporting the shuttle plate positioned adjacent the shuttle plate, the support plate has within itself a piston assembly with a piston rod and a hydraulic cylinder slideably mounted on the piston rod, the hydraulic cylinder having a first and a second collar slideably mounted on the piston rod, the first collar being connected to the first hydraulic coupling of the shuttle plate, the second collar being connected to the second hydraulic coupling of the shuttle plate, the hydraulic cylinder also having a hydraulic chamber positioned between the first and second collars, the hydraulic chamber having a piston slideably mounted on the piston rod between the first and second collars, the piston for pushing against the first and second collars to force the first and second collars, the first and second hydraulic couplings, and the shuttle plate to move laterally; and a first ejection mechanism for the first mold core and a second ejection mechanism for the second mold core, the first ejection mechanism for being actuated independently of the second ejection mechanism;

wherein the piston is moved toward the second collar by forcing pressurized hydraulic fluid into the first hydraulic channel, and the piston is moved toward the first collar by forcing pressurized hydraulic fluid into the second hydraulic channel.

5. The shuttling system of claim 4 wherein the first and second mold cores each have at least one cooling passageway.

6. The shuttling system of claim 4 further comprising a robot device for removing products, the robot device having a take out plate with at least one arm capable of being aligned with the first and second mold cores, the at least one arm having a central bore for receiving products from the first and second mold cores.

7. The shuttling system of claim 6 wherein the at least one arm has at least one cooling channel.

8. The shuttling system of claim 4 wherein the first collar includes a first hydraulic passage in fluid communication with the first hydraulic coupling and the hydraulic chamber, and the second collar includes a second hydraulic passage in fluid communication with the second hydraulic coupling and the hydraulic chamber, and wherein pressurized hydraulic fluid introduced into the first hydraulic channel passes through the first hydraulic coupling and the first hydraulic passage, and into the hydraulic chamber to force the piston to slide along the piston rod and push the second collar in a first lateral direction, and pressurized hydraulic fluid introduced into the second hydraulic channel passes through the second hydraulic coupling and the second hydraulic passage, and into the hydraulic chamber to force the piston to slide along the piston rod and push the first collar in a second lateral direction opposite the first lateral direction.

9. The shuttling system of claim 4 wherein the first collar includes a first hydraulic passage in fluid communication with the first hydraulic coupling and the hydraulic chamber, and the second collar includes a second hydraulic passage in fluid communication with the second hydraulic coupling and the hydraulic chamber, and wherein introducing pressurized hydraulic fluid through the first hydraulic passage and into the hydraulic chamber forces the piston to slide along the piston rod and push the second collar in a first lateral direction, and introducing pressurized hydraulic fluid through the second hydraulic passage and into the hydraulic chamber forces the piston to slide along the piston rod and push the first collar in a second lateral direction opposite the first lateral direction.

10. An injection molding apparatus for molding products comprising:

at least one nozzle for injecting a molten material;

a first mold part having at least one injection cavity for receiving molten material, the at least one injection cavity being aligned and in fluid communication with the at least one nozzle, the first mold part also having at least a pair of cooling chambers flanking the at least one injection cavity; and a second mold part having a laterally moveable shuttle plate with a first mold core, a second mold core, a first hydraulic coupling, a second hydraulic coupling, a first hydraulic channel connected to the first hydraulic coupling, and a second hydraulic channel connected to the second hydraulic coupling, the first and second mold cores for being aligned with and inserted into both the at least one injection cavity and the cooling chambers, the second mold part also having a support plate for supporting the shuttle plate positioned adjacent the shuttle plate, the support plate has within itself a piston assembly with a piston rod and a hydraulic cylinder slideably mounted on the piston rod, the hydraulic cylinder having a first and a second collar slideably mounted on the piston rod, the first collar being connected to the first hydraulic coupling of the shuttle plate, the second collar being connected to the second hydraulic coupling of the shuttle plate, the hydraulic cylinder also having a hydraulic chamber positioned between the first and second collars, the hydraulic chamber having a piston slideably mounted on the piston rod between the first and second collars, the piston for pushing against the first and second collars to force the first and second collars, the first and second hydraulic couplings, and the shuttle plate to move laterally;

wherein a first product is formed on the first mold core in the at least one injection cavity, while a second product is simultaneously cooled in one of the cooling chambers, and the piston is moved toward the second collar by forcing pressurized hydraulic fluid into the first hydraulic channel and the piston is moved toward the first collar by forcing pressurized hydraulic fluid into the second hydraulic channel.

11. The injection molding apparatus of claim 10 further comprising a first neck insert positioned around the first mold core for holding the first product, and a second neck insert positioned around the second mold core for holding the second product, the first and second neck inserts for being independently moved toward the first mold part, the first and second neck inserts for also being independently separated into a first section and a second section for releasing the first and second products.

12. The injection molding apparatus of claim 10 wherein the second mold part further includes a first ejection mechanism for the first mold core and a second ejection mechanism for the second mold core, the first ejection mechanism capable of being actuated independently of the second ejection mechanism.

13. The injection molding apparatus of claim 12 wherein the first and second ejection mechanisms each comprise a stripper plate surrounding each of the first and second mold cores, a slide surrounding each of the first and second mold cores, and a neck insert attached to the slide and surrounding each of the first and second mold cores, the stripper plate for moving the slide forward toward the first mold part, and the slide for separating the neck insert into at least two sections.

14. The injection molding apparatus of claim 10 further comprising a robot device for removing products, the robot device having a take out plate with at least one arm for being aligned with the first and second mold cores, the at least one arm having a central bore for receiving products from the first and second mold cores.

15. The injection molding apparatus of claim 14 wherein the at least one arm has at least one cooling channel.

16. The injection molding apparatus of claim 10 wherein the first and second mold cores each have at least one cooling passageway.

17. The injection molding apparatus of claim 10 wherein the first collar includes a first hydraulic passage in fluid communication with the first hydraulic coupling and the hydraulic chamber, and the second collar includes a second hydraulic passage in fluid communication with the second hydraulic coupling and the hydraulic chamber, and wherein pressurized hydraulic fluid introduced into the first hydraulic channel passes through the first hydraulic coupling and the first hydraulic passage, and into the hydraulic chamber to force the piston to slide along the piston rod and push the second collar in a first lateral direction, and pressurized hydraulic fluid introduced into the second hydraulic channel passes through the second hydraulic coupling and the second hydraulic passage, and into the hydraulic chamber to force the piston to slide along the piston rod and push the first collar in a second lateral direction opposite the first lateral direction.

18. The injection molding apparatus of claim 10 wherein the first collar includes a first hydraulic passage in fluid communication with the first hydraulic coupling and the hydraulic chamber, and the second collar includes a second hydraulic passage in fluid communication with the second hydraulic coupling and the hydraulic chamber, and wherein introducing pressurized hydraulic fluid through the first hydraulic passage and into the hydraulic chamber forces the piston to slide along the piston rod and push the second collar in a first lateral direction, and introducing pressurized hydraulic fluid through the second hydraulic passage and into the hydraulic chamber forces the piston to slide along the piston rod and push the first collar in a second lateral direction opposite the first lateral direction.

* * * * *